United States Patent [19]

Abe et al.

[11] Patent Number: 5,264,552

[45] Date of Patent: Nov. 23, 1993

[54] ORGANIC POLYMER, CONDUCTING ORGANIC POLYMER, PRODUCTION METHODS AND USES OF THE SAME

[75] Inventors: Masao Abe; Akira Ohtani; Hiroyuki Higuchi; Minoru Ezoe; Shinya Akizuki; Keiji Nakamoto; Keiko Mochizuki; Yasuhiro Umemoto; Michio Umeda, all of Osaka, Japan

[73] Assignee: Nitto Denko Corporation, Osaka, Japan

[21] Appl. No.: 413,502

[22] Filed: Sep. 27, 1989

[30] Foreign Application Priority Data

Sep. 30, 1988 [JP] Japan .................................. 63-248533
Mar. 9, 1989 [JP] Japan .................................. 1-57163
Aug. 7, 1989 [JP] Japan .................................. 1-204181

[51] Int. Cl.$^5$ .............................................. C08G 73/00
[52] U.S. Cl. ..................................... 528/422; 525/539
[58] Field of Search ................ 528/422; 252/500, 518; 525/539

[56] References Cited

U.S. PATENT DOCUMENTS

4,615,829 10/1986 Tamura ............................. 252/500
4,803,096 2/1989 Kuhn et al. ........................ 252/500

FOREIGN PATENT DOCUMENTS

22108 7/1978 Japan .
1337 1/1981 Japan .
1338 1/1981 Japan .
235831 11/1985 Japan .
258831 11/1986 Japan .

OTHER PUBLICATIONS

J. Chemical Soc. Chem Commun. Feb. 1987 pp. 1784–1786; Polyaneline: Non–Oxidative Doping of the Emeraldine Base Form to the Metallic Regime.

Primary Examiner—Mark L. Bell
Assistant Examiner—C. M. Bonner
Attorney, Agent, or Firm—Sughrue, Mion, Zinn, Macpeak & Seas

[57] ABSTRACT

This invention relates to an organic polymer having, as the main repeating unit, the compound represented by the general formula:

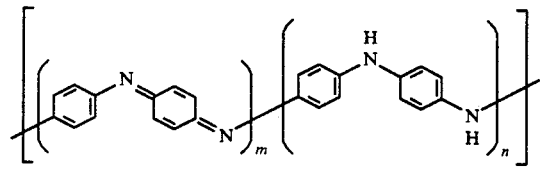

(wherein, m and n respectively show the molar fraction of quinonediimine structure unit and phenylenediamine structure unit in the repeating unit, and $0<m<1$, $0<n<1$, and $m+n=1$.), and soluble in an organic solvent in an undoped state, and having the intrinsic viscocity $[\eta]$ of more than 0.4 dl/g measured in N-methyl-2-pyrrolidone at 30° C., and a conducting organic polymer formed by doping a protonic acid to such a polymer.

9 Claims, 9 Drawing Sheets

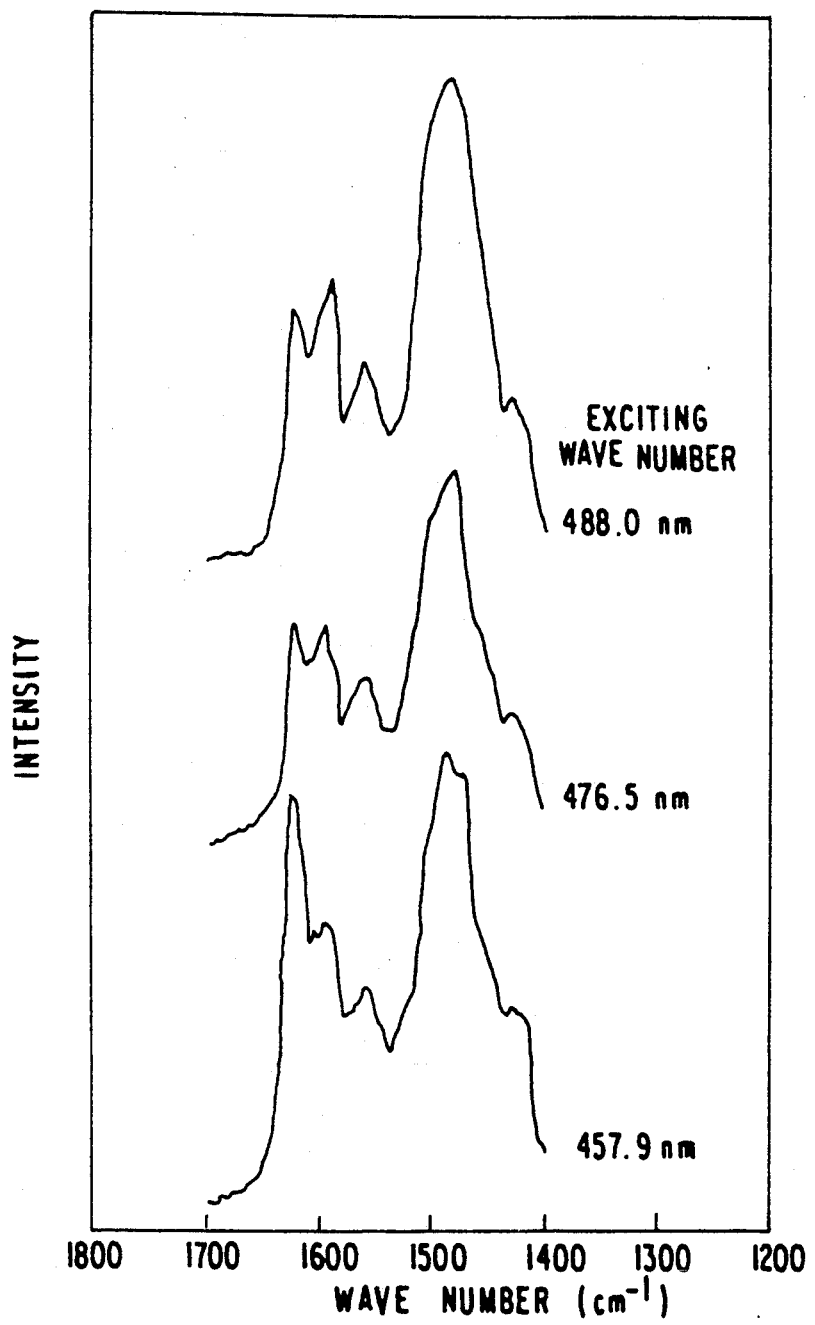

ORGANIC POLYMER, CONDUCTING ORGANIC POLYMER, PRODUCTION METHODS AND USES OF THE SAME

FIELD OF THE INVENTION

This invention relates to a novel high-molecular-weight organic polymer, a conducting organic polymer, the methods for producing them, and the uses of the same, and more particularly, a high-molecular-weight organic polymer having free-standing film forming properties and obtained by the chemical oxidative polymerization of aniline, a conducting organic polymer obtained therefrom, the methods for producing the same, and the uses thereof.

BACKGROUND OF THE INVENTION

The method for producing a conducting organic polymer containing an electrolytic ion as a dopant, and having electric conductivity of more than $10^{-6}$ S/cm by chemical oxidative polymerization of aniline with a chemical oxidizing agent is already known (U.S. Pat. No. 4,615,829), and further, the fact that, in the production of a conducting organic polymer by use of such chemical oxidative polymerization, an oxidizing agent having the standard electrode potential determined as an electromotive force in the reduction half cell reaction making the standard hydrogen electrode as a standard of more than 0.6 V is used preferably, is also already described in the official publication of Japanese Patent Application Laid-Open No. 258831/1986.

However, since the conducting organic polymer is generally insoluble and infusible, it cannot be formed into a film, and hence, there is a large hindrance for developing useful applications of the conducting organic polymer. As described in the official publication of Japanese Patent Application Laid-Open No. 235831/1985 and J. Polymer Sci., Polymer Chem. Ed., 26, 1531 (1988), although a film of the conducting organic polymer can be formed on the electrode, since the film formation surface is limitted to the surface of the electrode, it is difficult to obtain a film of large area, and moreover, since the film formation is effected by electrolytic oxidation, the production cost is high. Moreover, this film has low strength and is insoluble and infusible.

Therefore, various conversion methods have been proposed, in which an intermediate product soluble in an organic solvent is to be produced, and after making the solution into a film by the casting method, the intermediate product is changed to a conducting polymer by physical or chemical means. However, according to this method, treatment at a high temperature is required, and the change from the intermediate product to a conducting polymer does not necessarily proceed as shown theoretically, so that the method is not practical also as the production method of the conducting organic polymer film, when seen from the production side and the side of the physical properties of the film obtained.

In the field of polypyrrole or polythiophene, a polymer soluble in an organic solvent is known. The thiophene having a long chain alkyl group as a substitutent and the pyrrole having the alkane sulphonic acid group as a substituent were subjected to electrochemical oxidative polymerisation to obtain respectively poly-3-alkyl thiophene soluble in an organic solvent and polypyrrole-alkane sulphonic acid soluble in water. Films of any of these polymers can be obtained from their solutions by the casting method. However, this method uses special monomers in either case, and in addition, it must be subjected to electrochemical oxidative polymerisation, so that the production cost is extremely high.

On the other hand, in the field of chemical oxidative polymerisation of aniline, it is reported, in recent years, that a polyaniline soluble in an organic solvent can be obtained by applying about ¼ amount of ammonium peroxodisulpate as an oxidizing agent to aniline, to let aniline be subjected to chemical oxidative polymerization. (A. G. MacDiarmid et al., Synthetic Metals, 21, 21 (1987); A. G. MacDiarmid et al., L. Alcacer (ed.), Conducting Polymers, 105–120, D. Reidel Publishing Co., 1987)). However, this polymer is soluble not only in N-methyl-2-pyrrolidone and dimethyl sulphoxide, but also, in 80% acetic acid and 60% formic acid aqueous solution, and its molecular weight is low. It is also described that a free-standing film can be obtained from the solutions of the polymer in N-methyl-2-pyrrolidone and dimethyl sulphoxide. Further, it is also described that a conducting polymer film doped with acetic acid can be obtained from an acetic acid solution, and this is made as a film undoped with ammonia. However, since the film in this undoped state has a low molecular weight of polyaniline, its strength is low, and it is easily broken by bending, and it is hardly suitable for practical use.

Also, it is known that polyaniline soluble in tetrahydrofuran can be obtained by oxidising aniline with ammonium peroxodisulphate (J. Tang et al., Synthetic Metals, 24, 231 (1988)). However, this polymer can be considered to have a low molecular weight, since it dissolves in tetrahydrofuran.

SUMMARY OF THE INVENTION

The present inventors have eagerly investigated in order to obtain a high-molecular-weight organic polymer especially by the chemical oxidative polymerization of aniline, and as a result, have found out that the high-molecular-weight polymer of the present invention, although having a molecular weight far higher than that exhibited by the conventionally known polyaniline, is soluble in various organic solvents, and a free-standing film can be easily obtained from its solution by the casting method. This film is strong and has excellent flexibility, and together with that, it has high tensile strength. Further, it has been found that a strong, high-molecular-weight, highly conductive organic polymer film can be obtained by doping such a film with a protonic acid.

The organic polymer according to the present invention is characterized by having, as the main repeating unit, the compound represented by the general formula:

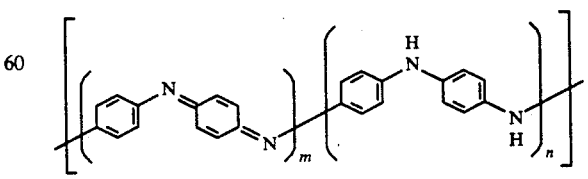

(wherein, m and n respectively show the molar fraction of quinonediimine structure unit and phnylenediammine structure unit in the repeating unit, and $0 < m < 1$, $0 < n < 1$, and $m+n=1$), soluble in an organic solvent in the undoped state, and having the intrinsic viscocity $[\eta]$ of more than 0.4 dl/g measured in N-methyl-2-pyrrolidone at 30° C.

Such an organic polymer according to the present invention has the feature that, in the ring vibration of the para-substituted benzene in the laser Raman spectrum obtained by exciting with the light of the wave length of 457.9 nm, the ratio Ia/Ib of the strength of the Raman line Ia of the ring stretching vibration appearing at the wavenumber higher than 1600 cm$^{-1}$ and the strength of the Raman line Ib of the ring stretching vibration appearing at the wavenumber lower than 1600 cm$^{-1}$ is more than 1.0.

DETAILED DESCRIPTION OF THE INVENTION

The oxidative polymer of aniline according to the present invention may be produced by preserving aniline in a solvent, while keeping the temperature at less than 5° C., or preferably, at a temperature of less than 0° C., under the presence of a protonic acid having the acid dissociation constant value pKa of less than 3.0, and by gradually adding the aqueous solution of an oxidizing agent having the standard electrode potential of more than 0.6 V, which is determined as the electromotive force in the reduction half cell reaction standardised with a standard hydrogen electrode, for more than two equivalents, or preferably, 2 to 2.5 equivalents, of the equivalent defined as the amount obtained by dividing one mole of the oxidizing agent with the number of electrons required for reducing one molecule of the oxidising agent to let the oxidative polymer of the aniline doped with the above-described protonic acid, and subsequently, by undoping this polymer with a basic substance.

As the above-described oxidising agent manganese dioxide, ammonium peroxodisulfate, hydrogen peroxide, ferric salts, iodic acid salts, etc. are preferably used. Among these, for example, in ammonium peroxodisulfate and hydrogen peroxide, two electrons participate per one molecule in both cases, so that the amount in the range of 1 to 1.25 mol is generally used.

The protonic acid used in oxidative polimerisation of aniline is not especially limited as long as the acid dissociation constant value pKa is less than 3.0. For example, inoganic acids such as hydrochloric acid, sulfuric acid, nitric acid, perchloric acid, hydrofluoroboric acid, hydrofluorophosphoric acid, hydrofluoric acid, hydroiodic acid, etc., aromatic sulfonic acids such as benzenesulfonic acid, p-toluenesulfonic acid, etc., alkane sulfonic acids such as methanesulfonic acid, ethanesulfonic acid, etc., phenols such as picric acid, etc., aromatic carboxylic acids such as m-nitrobenzoic acid, etc., aliphatic carboxylic acids such as dichloroacetic acid, malonic acid, etc., can be used. Further, polymer acids can also be used. As such polymer acids can be cited, for example, polystyrene sulfonic acid, polyvinyl sulfonic acid, polyallyl sulfonic acid, polyvinyl sulfuric acid, etc.

The amount of the protonic acid used depends on the reaction mode of the oxidizing agent used. For example, in the case of manganese dioxide, since the oxidation reaction is shown as $$MnO_2 + 4H^+ + 2e^- \rightarrow Mn^{2+} + 2H_2O,$$

it is necessary to use a protonic acid capable of supplying protons in at least 4 times the mol amount of the manganese dioxide used. Further, in using hydrogen peroxide since the oxidation reaction is shown as $$H_2O_2 + 2H^+ + 2e^- \rightarrow 2H_2O,$$

it is necessary to use a protonic acid capable of supplying protons in at least two times the mol amount of the hydrogen peroxide used. On the other hand, in the case of ammonium peroxodisulfate, since the oxidation reaction is shown as $$S_2O_8^{2-} + 2e^- \rightarrow 2SO_4^{2-},$$

it is not necessary to use protonic acid especially. However, in the present invention, it is preferable to use a protonic acid in equal mol amount to that of the oxidizing agent.

As the solvent for use in the oxidative polymerization of aniline, one which dissolves aniline, protonic acid, and oxidizing agent, and is not oxidized by the oxidizing agent may be used. Water is most preferably used, but, as needed alcohols such as methnol, ethanol, etc., nitriles such as acetonitrile, etc., polar solvents such as N-methyl-2-pyrrolidone, dimethyl sulphoxide, etc., ethers such as tetrahydrofuran, etc., organic acids such as acetic acid, etc. can be used. Also, the mixed solvent of these organic solvents with water can be used.

In the method for obtaining the solvent soluble aniline oxidative polymer according to the present invention, during the reaction, especially while the solution of the oxidizing agent is added to the aniline solution, it is important to preserve the temperature of the reaction mixture always below 5° C. Therefore, it is required that the solution of the oxidizing agent is gradually added to aniline lest the temperature of the reaction mixture exceed 5° C. When the oxidizing agent is rapidly added, the temperature of the reaction mixture rises, even if it is cooled from the outside, to form a polymer having low molecular weight, or to form a solvent insoluble oxidative polymer after the undoping as described in the following.

In particular, in the present invention, it is preferable to keep the reaction temperature below 0° C., and by taking such a care, it is possible, after the undoping, to obtain the solvent soluble aniline oxidative polymer of high molecular weight having the intrinisc viscocity $[\eta]$ of more then 1.0 dl/g measured at 30° C. in N-methyl-2-pyrrolidone (to be referred to in the same way in the following).

Thus, the oxidative polymer of aniline doped with the protonic acid used can be obtained. Since the oxidative polymer of aniline forms a salt with the protonic acid in the doped state, in the similar manner as that it is so in many of the conducting organic polymers in the doped state, it is in general insoluble in such solvents as those described in the following. For example, it is well known that the salts of high molecular weight amines are only slightly soluble in general in an organic solvent. However, the conducting organic polymer according to the present invention has two important characteristics in comparison with other conducting organic polymers.

First, the conducting organic polymer according to the present invention does not form precipitate, and stably dissolves in an aprotic polar organic solvent depending on the kind of protonic acid used as the dopant, if the concentration is less than several % by weight. In general, at the concentration of less than 5% by weight, a solution of the conducting organic polymer of such a doping state into an organic solvent can be obtained.

Here, as the above-described organic solvent, N-methyl-2-pyrrolidone is preferable. The solution of the conducting organic polymer in such a doped state as described above can from a thin film of conducting organic polymer on a substrate readily, when the organic solvent is removed therefrom after coating it on a suitable substrate.

Secondly, from the conducting organic polymer doped with the above-described protonic acid and insoluble in an organic solvent, an aniline oxidative polymer soluble in an organic solvent can be obtained by undoping.

Preferable protonic acids include, hydrofluoroboric acid, hydrofluorophosphoric acid, perchloric acid, etc., or any other the organic acids having acid dissociation constant pKa values of less than 4.8. In cases when the protonic acid is a mineral acid such as sulfuric acid, hydrochloric acid, nitric acid, etc., the doped polymers are difficult to dissolve in an organic solvent.

The organic acids having the above-described acid dissociation constant pKa value of less than 4.8 contain mono- or polybasic acid such as that of the aliphatic group, aromatic group, aromatic aliphatic group, alicyclic group, etc., and further such organic acids may have hydroxyl group, halogen atom, nitro group, cyano group, amino group, etc. Therefore, as concrete examples of such organic acids can be cited, for example, acetic acid, n-butyric acid, pentadecafluorooctanoic acid, pentafluoroacetic acid, trifluoroacetic acid, trichloroacetic acid dichloroacetic acid, monofluoroacetic acid, monobromoacetic acid, monochloroacetic acid, cyanoacetic acid, acetylacetic acid, nitroacetic acid, triphenylacetic acid, formic acid, oxalic acid, benzoic acid, m-bromobenzoic acid, p-chlorobenzoic acid, m-chlorobenzoic acid, o-nitrobenzoic acid, 2,4-dinitrobenzoic acid, 3,5-dinitrobenzoic acid, picric acid, o-chlorobenzoic acid, p-nitrobenzoic acid, m-nitrobenzoic acid, trimethylbenzoic acid, p-cyanobenzoic acid, m-cyanobenzoic acid, thymol blue, salicylic acid, 5-aminosalicylic acid, o-methoxybenzoic acid 1,6-dinitro-4-chlorophenol, 2,6-dinitrophenol, 2,4-dinitrophenol, p-oxybenzoic acid, bromophenol blue, mandelic acid, phthalic acid, isophthalic acid, maleic acid, fumaric acid, malonic acid, tartaric acid, citric acid, lactic acid, succinic acid, α-alanine, β-alanine, glycine, glycolic acid, thioglycolic acid, ethylenediammine-N,N'-diacetic acid, ethylenediammine-N,N,N',N'-tetraacetic acid, etc.

Also, the organic acid may have sulfonic acid or sulfuric acid groups. As such organic acids can be cited, for example, aminonaphtholsulfonic acid, metanilic acid, sulfanilic acid, allylsulfonic acid, laurylsulfuric acid, eylenesulfonic acid, chlorobenzenesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, benzenesulfonic acid, styrenesulfonic acid, p-toluenesulfonic acid, naphthalenesulfonic acid, etc.

Further, the organic acid may be a polymer acid. As such polymer acids, can be cited, for example, polyvinylsulfonic acid, polyvinylsulfuric acid, polystyrenesulfonic acid, sulfonated styrene-butadiene copolymer, polyallylsulfonic acid, polymethallylsulfonic acid, poly-2-acrylamide-2-methylpropanesulfonic acid, polyhalogenized acrylic acid, etc.

The fluorine-containing polymer known as Na f ione (registered trademark of Du Pont Co., U.S.A.) is preferably used as a polymer acid.

The conducting organic polymer doped with a polymer acid has different solubility depending on to the molecular weight of a polymer acid. Usually, the polymer acid having small molecular weight gives a high solubility conducting organic polymer in the doped state.

Further, the solution of the conducting organic polymer such as described above can be diluted with other organic solvents is necessary. For example, by adding a diluting agent to a solution in the order of about 2% by weight, a diluted solution can be prepared advantageously. As such a diluting agent, those having mutual solubility in N-methyl-2-pyrrolidone are preferable, and therefore, for example, alcohols, ketones, esters, ethers, nitriles, or other nitrogen-containing organic solvents are preferably used.

In particular, for example, aliphatic group alcohols such as methanol, ethanol, propyl alcohol, butyl alcohol, etc., are preferable for the diluting agents. However, glycols such as ethylene glycol can also be preferably used. Also, acetonitrile and tetrahydrofuran are preferable diluting agents.

Also, according to the present invention, depending on the extent of dilution, a hydrocarbon solvent such as, for example, n-hexane having no mutual solubility to N-methyl-2-pyrrolidone can be used as a diluting agent. Further, it is also possible to dissolve a hydrocarbon such as naphthalene which is solid at room temperature in the solution of the conducting organic polymer.

As described above, in cases when the protonic acid is a mineral acid such as sulfuric acid, hydrochloric acid, nitric acid, etc., the doped polymers are difficult to dissolve in an organic solvent. However, even in the case when the polymer solution has been added, for example, into a diluting solvent containing sulfuric acid, and the polymer has been precipitated, a uniform mixture in the micro-suspension state can be obtained by subjecting the mixture containing the precipitate to ultrasonic wave stirring. Such a mixture can form a conducting polymer thin film on a substrate, similarly as in the case of the solution, by coating it on a substrate and by removing the solvent.

As to the above-described second feature, since the undoping of the polymer doped with a protonic acid used is a kind of neutralization reaction, the undoping agent is not especially limitted, as long as it is a basic substance capable of neutralizing the protonic acid as a dopant. Aqueous ammonia, and metal hydroxides such as sodium hydroxide, potassium hydroxide, lithium hydroxide, magnesium hydroxide, calcium hydroxide, etc. are preferably used for this purpose. For the undoping, it will do that a basic substance is directly added into the reaction mixture after the above-described oxidative polymerization of aniline, or a basic substance may be applied after once separating out the polymer alone.

Although the polymer in the doped state, which has been obtained by the oxidative polymerisation of aniline has, in general, conductivity of more than $10^{-5}$ S/cm and is colored blackish green, it has a copper color mixed with violet, or faintly mixed with violet color after doping. This change in color is due to the change of the amine nitrogen in the salt structure in the polymer into free amine. The conductivity of this undoped polymer is, in general, in the order of $10^{-10}$ S/cm.

The thus obtained aniline oxidative polymer in the undoped state has a high molecular weight, and moreover, is soluble in various organic solvents. As such a solvent, can be cited N-methyl-2-pyrrolidone, N,N-dimethyl formamide, dimethyl sulfoxide, 1,3-dimethyl-2-imidazolidinone, sulfolan, etc. As to the solubility, although it depends on the average molecular weight of the polymer and the solvent, 0.5 to 100% of the polymer dissolves in a solvent, and a solution of 1 to 30% by weight can be obtained. In particular, the aniline oxidative polymer in the undoped state according to the present invention shows high solubility in N-methyl-2-pyrrolidone, and, in general, 20 to 100% of the polymer dissolves to enable to obtain a solution of 3 to 30% by weight. But, it does not dissolve into tetrahydrofuran, 80% acetic acid aqueous solution, 60% formic acid aqueous solution, acetonitrile, etc.

Therefore, according to the present invention, such a polymer soluble in a solvent can be made into the film by dissolving it in a solvent and forming it into a film by the casting method. For example, a uniform and strong free-standing film having excellent flexibility can be obtained by a process of casting the polymer solution on a glass plate into a film. The film thus obtained is heated and dried to remove the solvent.

In order to obtain a strong film having excellent flexibility, it is desirable to use the above-described solvent soluble polymer having intrinsic-viscosity $[\eta]$ of more than 0.40 dl/g.

Further, the film obtained by casting the above-described solvent soluble aniline oxidative polymer has different properties depending on the conditions of drying the solvent. In general, in the case of casting a N-methyl-2-pyrrolidone solution of the soluble polymer having the intrinsic viscocity $[\eta]$ of more than 0.40 dl/g on a glass plate and drying to remove the solvent, if the drying temperature is less than 100° C., the strength of the film obtained is not yet sufficiently large, and also, it partly dissolves in N-methyl-2-pyrrolidone. However, when the drying temperature is made higher than 130° C., the obtained film has an excellent flexibility and is very strong, and is not broken even upon bending. Also, the film obtained in such a manner does not dissolve in N-methyl-2-pyrrolidone, and furthermore, does not dissolve in concentrated sulfuric acid. The solvent insolubility of the polymer caused by the solvent drying at a high temperature after casting is considered to be due to the cross-linking of polymer chains by the coupling of radicals present in the polymer, or formed in heating.

The above-described soluble aniline oxydative polymer can be considered, from the results of measurements such as the elementary analysis, infrared absorption spectrum, ESR spectrum, laser Raman spectrum, thermogravimetric analysis, solubility in solvents, and visual or near infrared ray absorption spectrum, as a polymer having, as the main repeating unit, the compound represented by the general formula:

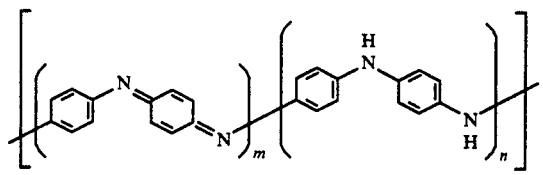

(wherein, m and n respectively show the molar fraction of quinonediimine structure unit and phnylenediammine structure unit in the repeating unit, and $0<m<1$, $0<n<1$, and $m+n=1$), soluble in an organic solvent in the undoped state, and having the intrinsic viscocity $[\eta]$ of more than 0.4 dl/g measured in N-methyl-2-pyrrolidone at 30° C.

The film obtained by making the above-described solvent soluble polymer to be insoluble in a solvent by the casting method also shows an infrared ray absorption spectrum substantially the same as that of the solvent soluble polymer, and can be considered to have a cross-linked structure but to be consisting of substantially the same repeating units from the results of measurement on the elementary analysis, infrared absorption spectrum, ESR spectrum, laser Raman spectrum, thermogravimetric analysis, solubility in a solvent, visible or near infrared spectrum, etc.

In the solvent soluble polymer shown by the above-described general formula, the values m and n can be adjusted by oxidizing or reducing the polymer. That is, by reducing it, m is decreased and n is increased. On the contrary, by oxidizing it, m is increased and n is decreased. When the quinonediimine structural unit in the polymer is decreased, the solubility of the polymer into the solvent is enhanced. Also, in comparison with the state before reduction, the viscosity of the solution becomes lower.

In order to reduce such a solvent soluble polymer, hydrazines such as hydrazine hydrate, phenyl hydrazine, etc., metal hydrides such as lithium aluminium hydride, lithium borohydride, etc., and hydrogen or the like are preferably used. Phenyl hydrazine is most preferably used since it dissolves in an organic solvent, and in particular, in N-methyl-2-pyrrolidone, but does not reduce N-methyl-2-pyrrolidone. On the other hand, the oxidizing agent used in order to oxidize the solvent-soluble polymer may be any of the ones capable of oxidizing the phenylenediammine structural unit in the general formula, but the oxidizing agent having the standard electrode potential of more than 0.3 V determined as the electromotive power in the reduction half cell reaction standardised on the standard hydrogen electrode is especially preferably used. For example, as a mild oxidizing agent silver oxide is preferably used. The blowing in of oxygen is also useful. As a powerful oxidizing agent, potassium permanganate, potassium dichromate, etc., can also be used, but in the use thereof it is necessary not to bring about the deterioration of the polymer.

As described above, since the partial reduction of the solvent-soluble polymer decreases the viscosity of the polymer solution, it is useful in preserving the solution of the solvent-soluble polymer stable in the above-described doped state.

Also, for example, a basic substance such as triethyl amine is also useful for relaxing the interaction between the protonic acid and polymer, to preserve the stable solution state.

Therefore, according to the present invention, it is possible, by adding the above-described reducing agent and a basic substance as additives to the solution containing the conducting organic polymer of the doped state and a protonic acid, to preserve the above-described solution in a stable form. As described above, when the solution of the conducting organic polymer containing reducing agent and basic substance together with protonic acid is coated on a substrate, since these reducing agent and basic substance are also evaporated at the time of removal of the solvent, a layer of conducting organic polymer doped with protonic acid is formed on the substrate. Although the excss protonic acid will remain on the substrate, it can be removed by washing with water if necessary.

Also, according to the present invention, the solution containing the conducting organic polymer in the doped state and a protonic acid may include various resins functioning as a binder, as an increasing agent. The resin used as a binder is not especially limited as long as it is one capable of dissolving in a solvent.

In the reduction of the above-described polymer, in cases when excess amount of reducing agent has been used, since many of the quinonediimine structural units in the polymer are reduced, the formation of semiquinone radical (polaron structure) due to the doping of the protonic acid to the quinonediimine structural units are inhibited and therefore, the conductivity of conducting organic polymer obtained is not so high at the moment immediately after the doping. However, by leaving the doped polymer standing in air, the reduced phenylenediammine structural units gradually return back to the quinonediimine structural units, and form semiquinone radicals by being doped with the residual protonic acid in the polymer layer, so that an organic polymer of high conductivity can be obtained.

The surface resistance of the conducting organic polymer thin film is, in general, in the order of $10^5$ to $10^{10}$ $\Omega/\square$, although it is different depending on to the protonic acid used.

Below, explanation will be given on the feature of the organic polymer according to the present invention obtained from the laser Raman spectrum, by comparing it with that of the so-called polyaniline hitherto known.

In general, as the means for obtaining information relating to the vibration between atoms constituting a substance, there is known the vibration spectroscopy, which includes the infrared spectroscopy and Raman spectroscopy. The infrared spectroscopy is useful in detecting the vibrational modes causing the change of the dipole moment, and the Raman spectroscopy is useful in detecting the vibration causing the change of the polarizability. Therefore, both techniques are in a complementary relationship, and in general, the vibrational mode appearing strongly in the infrared spectroscopy appears weak in the Raman spectroscopy, and on the other hand, the vibrational mode appearing strong in the Raman spectroscopy, appears weak in the infrared spectroscopy.

The infrared absorption spectrum is obtained by detecting the energy absorption between the vibrational energy levels, and the Raman spectrum is obtained by detecting the scattering light (Raman scattering) generated in dropping to a higher vibrational energy level of the ground state after the molecule has been excited with the irradiation of light. At this time, the vibrational energy level can be known from the energy difference of the scattering light and the irradiated light.

In general, the Raman spectrum is obtained by the visible light excitation from an argon laser, or the like. Here, it is known that a very strong Raman line is obtained, in such a case that the sample has an absorption band in the visible region, when the irradiated laser beam and the absorption band thereof matches, and the phenomenon is called as the resonance Raman effect. According to this effect, Raman lines stronger than $10^4$ to $10^5$ times of the usual Raman lines are obtained. By means of such a resonance Raman effect, the information on the chemical structure of the molecule part excited by the wave length of the irradiated laser beam is obtained by being more emphasised. Therefore, by measuring the Raman spectrum while changing the wave length of the laser beam, the chemical structure of the sample can be more exactly analyzed. Such a feature as described above is the feature of the Raman spectroscopy, which can not be found in the infrared spectroscopy.

FIG. 1 shows the laser Raman spectrum obtained by the irradiation at the exciting wave length of 457.9 nm of the sample formed in a disk-like shape of the powder of the polyaniline in the undoped state, which is soluble in an organic solvent, and has the intrinsic visocity $[\eta]$ of 1.2 dl/g measured at 30° C. in N-methyl-2-pyrrolidone. The assignment of the Raman lines are as follows: The lines 1622 and 1591 cm$^{-1}$ are assigned to the ring stretching vibration of para-substituted benzene, lines 1489 and 1479 cm$^{-1}$ the stretching vibration of C=C and C=N of the quinonediimine structure, line 1220 cm$^{-1}$ the mixed existence of C—N stretching vibration and C—C stretching vibration, and lines 1185 and 1165 cm$^{-1}$ the in-plane bending vibration of C—H.

FIG. 2 shows the laser Raman spectrum obtained by irradiating at an exciting wave length of 457.9 nm to an polyaniline in the undoped state shown in Y. Furukawa et al., Synth. Met., 16, 189, (1986). This polyaniline was obtained by the electrochemical oxidative polymerisation of aniline on a platinum electrode.

As can be seen in FIG. 1, in the polyaniline in the sovent soluble undoped state according to the present invention, the ratio Ia/Ib of the Raman line strength Ia of the ring stretching vibration appearing at the wave number higher than 1600 cm$^{-1}$ and the Raman line strength Ib of the ring stretching vibration appearing at the wave number lower than 1600 cm$^{-1}$ is more than 1.0. In contrast to this, the hitherto known polyaniline including the polyaniline shown in FIG. 2, including the one made by chemical oxidative polymerization, all have the above-described ratio Ia/Ib of smaller than 1.0.

Both of the Raman lines of 1622 and 1591 cm$^{-1}$ are based on the ring stretching vibration of para-substitted benzene. Since the polyaniline in the reduced state has no quinonediimine structure, the Raman line appears at 1621 cm$^{-1}$ only, but in the polyaniline in the undoped state having the quinone diimine structure, Raman lines appear at 1622 and 1591 cm$^{-1}$ as described above. These Raman lines show the exciting wave length dependency as shown in FIG. 3.

Accompanying to the change of the exciting wave length to the short wave side such as from 488.0 nm via 476.5 nm to 457.9 nm, the ratio Ia/Ib changes. That is, at 488.0 nm, the ratio Ia/Ib is less than 1.0, but at 457.9 nm, it is more than 1.0, and the strength of Ia/Ib is reversed. This reverse phenomenon can be explained as follows.

In FIG. 4 is shown the electronic spectrum of the solvent soluble polyaniline according to the present invention. Since the peak at 647 nm vanishes by reducing the polyaniline, it seems to be derived from the quinonediimine structure, and the peak at 334 nm seems to be derived from the π-π* transition of para-substituted benzene. In FIG. 4 is also shown the above-described Raman exciting wave length. Here, as to the band of the ring stretching vibration of para-substituted benzene, it is assumed as that, when the exciting wave length is changed to the short wave side such as from 488.0 nm to 457.9 nm, the resonance conditiions of the resonance Raman effect of the band of 1622 cm$^{-1}$ becomes more advantageous in comparison with the band of 1591 cm$^{-1}$, and the change of the relative strength as described above is generated.

Next, the fact that, in the spectra shown in FIG. 1 and in FIG. 2, the relative strength of the Raman lines of 1591 cm$^{-1}$ and 1622 cm$^{-1}$ is different despite being generated by the same exciting wave length (457.9 nm), will be explained as follows. That is, since N,N'-diphenyl-p-phenylene diamine as a model compound of the phenylenediamine structure has a Raman line at 1617 cm$^{-1}$ only, and N,N'-diphenyl-p-benzoquinonediimine as a model compound of the quinonediimine structure has Raman lines at 1568 cm$^{-1}$ and at 1621 cm$^{-1}$, it is estimated that, as shown in the following (a), the para-substituted benzene ring non-conjugated to the quinonediimine structure has the Raman line of 1622 cm$^{-1}$ with increased strength by the excitation of the short wavelength light, and as shown in (b) in the following the para-substituted benzene ring conjugated to the quinone diimine structure has the Raman lines of 1591 cm$^{-1}$ and 1622 cm$^{-1}$.

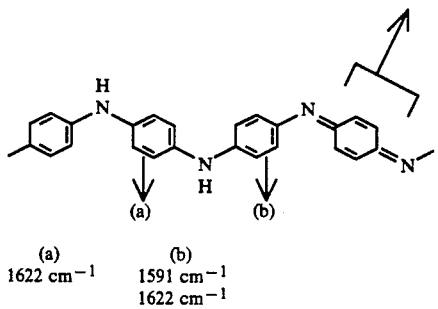

(a) 1622 cm$^{-1}$ (b) 1591 cm$^{-1}$
1622 cm$^{-1}$

Since the number of quinonediimine and the number of phenylenediamine can be considered to be approximately equal from the results of the elementary analysis, in the solvent soluble polyaniline of the undoped state according to the present invention, the structure sequential chain of the solvent soluble polyaniline of such undoped state can be classified into two of the alternating copolymer-like continuous chain of the quinonediimine structure and phenylenediamine structure as shown in (c), and the block copolymer-like sequence of the quinone diimine structure and phenylenediamine structure as shown in (d). In the figure, the para-substituted benzene ring shown with an arrow mark shows the benzene ring non-conjugated to quinonediimine, and in the above-described alternating copolymer-like sequence, for example, they are two per 8 monomer units, and in the block copolymer-like sequence, they are three. In the case when the sequence unit is longer, the difference of the numbers of the quinonediimine and the non-conjugated benzene ring in both ones becomes larger. It can be said that this difference appears as the difference of the relative strength of the Raman lines of 1591 cm$^{-1}$ and 1622 cm$^{-1}$.

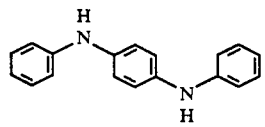

N,N'-diphenyl-p-phenylenediamine

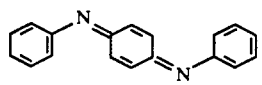

N,N'-diphenyl-p-benzoquinonediimine
quinonediimine structure

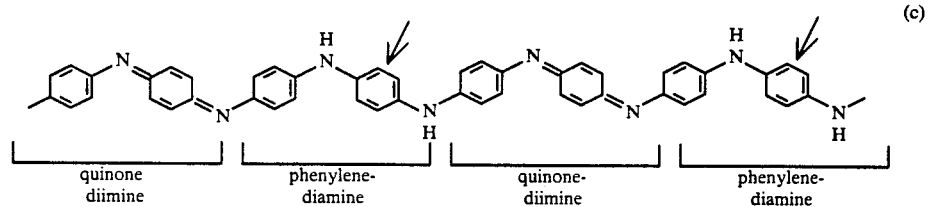

| quinone- | phenylene- | quinone- | phenylene- |
| diimine | diamine | diimine | diamine |

(c)

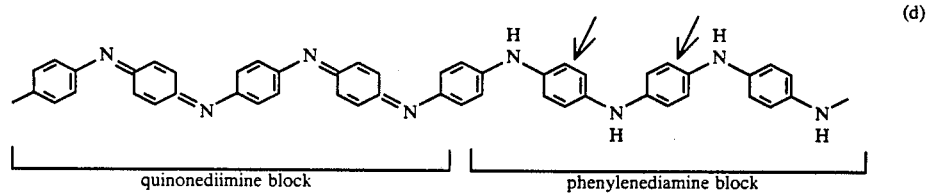

| quinonediimine block | phenylenediamine block |

(d)

Since, in the solvent soluble polyaniline according to the present invention, the Ia/Ib ratio in the laser Raman spectrum is more than 1.0, it seems that many benzene rings non-conjugated to quinonediimine structures are contained in the polyaniline, and thus, it has the above-described block copolymer-like sequence.

The organic solvent soluble properties of the polyaniline according to the present invention can be explained by the fact that it has such a block copolymer-like sequence. Although it is known that, in general, the imine nitrogen (—N=) in the quinonediimine structure forms hydrogen bonds with the secondary amino group hydrogen (—NH—) (Macromolecules, 21, 1297 (1988)), the hydrogen bond between the secondary amino groups is not strong.

Therefore, when polyaniline has the above-described alternating copolymer-like sequence, it forms a strong network hydrogen bonds as shown in (f). The fact that the heretofore known polyaniline is insoluble in many organic solvents seems to be caused by the formation of a strong network of such hydrogen bonds. In contrast to this, when the polymer sequence is the above-described block copolymer-like sequence such as that appearing in the solvent soluble polyaniline of the undoped state according to the present invention, since the block chain has different length in general, many hydrogen bonds can not be formed, even if the phenylenediamine structure part and the quinonediimine structure part are adjacent as can be seen in (e), so that the solvent penetrates between the polymer chains and hydrogen bonds are generated between the solvent, and the polymer is dissolved in the organic solvent. If it is assumed that the block chains have perfectly the same length at every part, the network of the hydrogen bonds such as described above will be formed, but the probability of having such a structure is extremely small, and it can be neglected.

that of the line 1181 cm$^{-1}$ which is assigned to the C—H in-plane bending vibration in the reduced state.

From these points of view, the solvent soluble polyaniline according to the present invention is considered to have the block copolymer-like sequence in the undoped state, and has the atmosphere of reducing structure. From this fact, it is considered to have a high solubility in an organic solvent, in spite of that it has a high molecular weight. As described above, the polyaniline according to the present invention is a novel polymer having a structural sequence different from that of the hitherto known polyaniline.

As described above, since the oxidative polymer of aniline according to the present invention has the quinonediimine structural unit and the phenylenediamine structural unit as the repeating units in the block copolymer-like sequence, it is explained in such a manner that, in the doped state with a protonic acid, it has conductivity as a result of the acid base reaction only, without an acompanying the oxidation reduction reaction. This conductivity mechanism was recognized by A. G. MacDiarmid et al. (A. G. McDiarmid et al., J. Chem. Soc., Chem. Commun., 1987, 1784). The quinonediimine structure is protonized by the doping with the protonic acid to take a semi-quinone cation

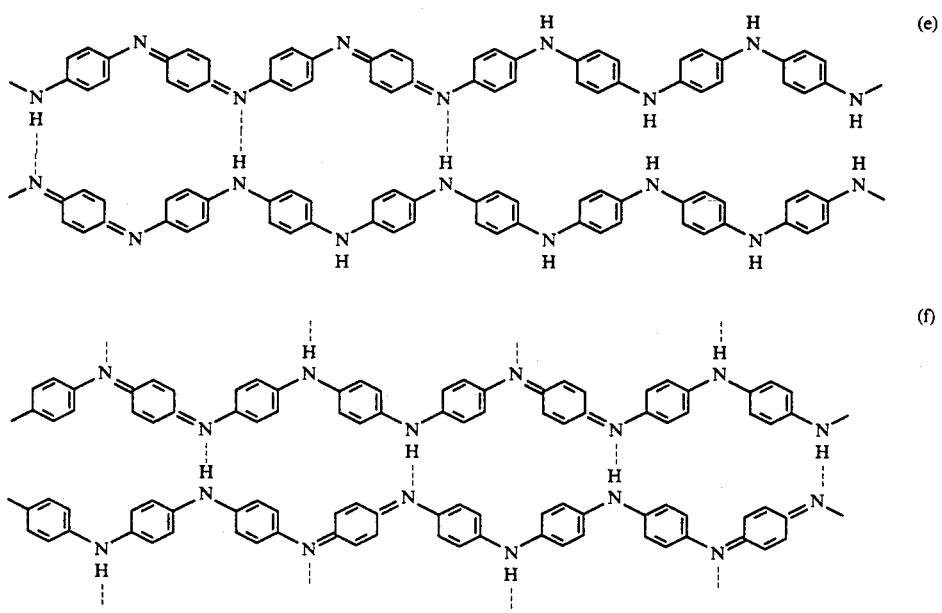

Further, such interaction between the chains as described above, can be explained from the C—H in-plane bending vibration of the above-described laser Raman spectrum. The Raman line of 1162 cm$^{-1}$ assigned to the C—H in-plane bending vibration of the polyaniline in the undoped srate shown in the above-described FIG. 2 is shifted to the higher wavenumber of 1181 cm$^{-1}$, when the polyaniline is reduced and all imine nitrogen groups are transformed into secondary amino nitrogen groups.

As described above, in the solvent soluble polyaniline according to the present invention, in the undoped state, there are two lines such as 1165 and 1185 cm$^{-1}$ as the Raman lines assigned to the C—H in-plane bending vibration. The Raman line of 1185 cm$^{-1}$ is the one which can not be seen in the hitherto known polyaniline in the undoped state, and shows a value nearly equal to radical structure which has conductivity. Such a state is called a polaron state.

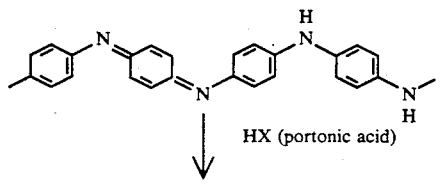

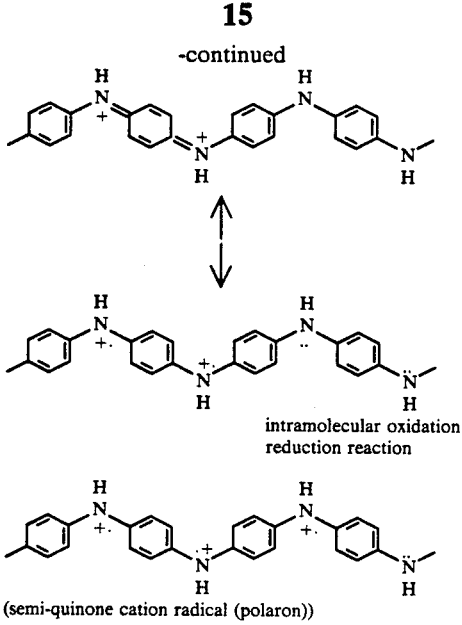
(semi-quinone cation radical (polaron))

As described above, the polyaniline which is solvent soluble in the undoped state according to the present invention can be dissolved in an organic solvent, and can be formed into a free-standing film by the casting method, and a composite film can be also obtained by making the solution into a film by the casting method on an appropriate substrate, and by doping such a film with a protonic acid, a conductive film is readily given. Here, as the protonic acid the ones as described above may be used.

Before doping, the reflected light from the film exhibits copper color and the transmitted light blue color. But, after doping with a protonic acid, the reflected light exhibits a blue color, and the transmitted light a green color. Also, after doping, the reflectance of the near infrared region (1000 to 2000 nm) changes to a large extent. That is, before doping, almost all the infra-red rays are reflected, but after doping, almost all of the infra-red rays are absorbed.

The conductivity of the conductive film obtained by doping depends on the pKa value of the protonic acid used. For the doping of the oxidative polymer of aniline the protonic acid having the pKa value of less than 4.8 is effective, and when the protonic acid having the pKa value of 1 to 4.8 is used, the smaller the pKa value thereof is, that is, the stronger the acidity is, the higher the conductivity of the film obtained is. However, when the pKa value is less than 1, the conductivity of the film obtained changes little and is approximately constant. However, if necessary, a protonic acid having the pKa value of less than 1 may be used.

In such a manner as described above, the conductivity of the conductive film according to the present invention, and obtained by doping of a protonic acid, is, in general, more than $10^{-5}$ S/cm, and in many cases, more than $10^{-4}$ S/cm. Accordingly, the conductive film according to the present invention is solely, or as a composite film, very useful, for example, as an anti-electrostatic material such as described in the following.

This conducting film according to the present invention is strong, and does not easily break, even if it is bent. However, since this conducting film is doped with a protonic acid, in the same way as in the conducting polymer prepared under the existence of a protonic acid, it is insoluble in the above-described organic solvent, due to the above-described reason, or owing to the cross-linking by the coupling of the radicals formed in the heat and evaporation process of the solvent in the time of film preparation.

According to the present invention, a conducting film in which the undoping is especially difficult can be obtained by using polyvinyl sulfonic acid as the protonic acid.

In general, the polyaniline obtained by oxidative polymerization is doped with the protonic acid used in the time of polymerization. However, it is known that such a conducting polyaniline releases the protonic acid as a dopant in a weakly acidic, neutral, or alkaline aqueous solution, or in a basic organic solvent to remarkably lower its conductivity.

Further, since the protonic acid generally used heretofore as a dopant is a low molecular acid, such as hydrochloric acid, sulfuric acid, perchloric acid, etc., when a polyaniline thin film having such a low molecular acid as a dopant was used, for example, as an anti-electrostatic material, the low molecular acid is apt to be diffused to cause the fear of corroding the metal part of the circumference.

However, in the conducting polyaniline having polyvinyl sulphonic acid as a dopant according to the present invention, the lowering of its conductivity is remarkably small in an aqueous solution of more than pH 2.5, or especially in the nearly neutral one, in comparison with not only the above-described polyaniline with a low molecular acid as a dopant, but also with the polyaniline having polymer acids such as polystyrene sulfonic acid, polyallyl sulfonic acid, polyvinyl sulfuric acid, etc., as a dopant.

The reason why the lowering of the conductivity of the polyaniline having polyvinyl sulfonic acid as a dopant is remarkably small, is not necessarily clear, but it is considered to be due, in addition to the polymer effect that the polyvinyl sulfonic acid is a polymer acid having polyvalent charge, but also to the molecular structure effect that the polyvinyl sulfonic acid mutually acts strong with polyaniline in the molecular level.

In order to dope the polyaniline in the undoped state with polyvinyl sulfonic acid, the above-described polyaniline is immersed in an aqueous solution of polyvinyl sulfonic acid of pH of less than 2. Although the time required for doping depends on the film thickness of the polyaniline film used and the pH of the polyvinyl sulfonic acid aqueous solution, it may be so long as several tens of seconds to several days. In order to shorten the doping time, it is preferable that an aqueous solution of pH of less than 1 is used. Further, in general, when a polyvinyl sulfonic acid having low polymerization degree is used, doping can be effected rapidly, and on the other hand, when the polyvinyl sulfonic acid having a high polymerization degree is used, a conducting polyaniline film in which undoping is more difficult can be obtained.

In such a manner as described above, since in the polyaniline having polyvinyl sulfonic acid as a dopant it is difficult to release the dopant in a weakly acidic, neutral, or alkaline aqueous solution, its conductivity is not changed in the various procedures in the time of production of the conducting polyaniline film, even by washing with water and an organic solvent, and a conducting film can be advantageously produced.

Further, since a conducting film without containing other protonic acid such as, for example, the above-described low molecular acid as a dopant can be obtained, for example, by washing with water sufficiently, after doping the polyaniline with polyvinyl sulfonic acid, such a conducting film has no fear of corroding of the metal parts in the circumference of the apparatus by the low molecular acid which might be partly mixed as a dopant in the conducting polyaniline. Also, in case when the conducting polyaniline is used in water and in an organic solvent, the conductivity is preserved for a long period. Therefore, such a conductive film as this can be used with high reliability, and preferably as an electric and electronic material such as the anti-electrostatic material, electro-magnetic wave shielding material, etc.

According to the present invention, by utilizing the coating properties of the above-described solvent soluble aniline oxidative polymer solution, other than the organic polymer film, composite bodies produced by making the surfaces of various articles conductive can be obtained.

Such a composite body as described above can be obtained by coating the solution of the above-described oxidative polymer of aniline soluble in an organic solvent on a substrate, and after making a thin film, the film is doped with a protonic acid. Here, the substrate is not especially limited, but for example, such materials as the films comprising various resins, molded products, foamed bodies, fibres, cloths, non-woven cloths comprising glass or resins, plate, foil, fibre, structured bodies consisting of metals, etc may be used. As a preferable example of such a composite body, for example, a conductive composite film may be made by coating the solution of the above-described oxidative polymer of aniline soluble in an organic solvent on a substrate made of polyimide film or polyester film to form a thin film, and subsequently, by doping the film with a protonic acid.

In particular, according to the present invention, since the coating procedure on the substrate and the doping procedure of the solvent soluble polyaniline can be effected separately, continuous production of such a conductive composite film is easily carried out. Also, according to the present invention, since the solvent soluble polyaniline can be made into a film by casting and coating, a thin film having very thin film thickness and high transparency can be obtained on the substrate. For example, after continuously forming a thin film with film thickness of 0.01 to 0.5 $\mu$m on a transparent substrate film such as that made of polyethylene terephthalate, the film can be rolled up. Further, by adjusting the thickness of the thin film, the surface resistance can be controled in various ways. Such a composite body can be preferably used as an anti-electrostatic composite body. In particular, by making the thickness of the thin film as about 0.01 to 0.5 $\mu$m, the composite film obtains visual light transmissivity of 80% or more, and an anti-electrostatic film having the surface resistance of about $10^4$ to $10^{11}$ $\Omega/\square$ can be obtained.

Also, by using the conductive composite film thus obtained having the anti-electrostatic function, and by adding thereto a release agent layer and an adhesive agent layer, a pressure-sensitive adhesive tape without being peeling charged in the time of winding back of the tape can be obtained. As the release agent, is used ordinary ones such as the silicone compounds, long chain alkyl compounds, etc., and as the adhesive agent, acrylic compounds, rubber compounds, etc.

According to the present invention, except that the ordinary method can be used in forming a film or a thin film on a substrate such as, for example, a polyethylene terephthalate film or a polyimide film by casting the solvent soluble polyaniline, it is preferable that the solvent soluble polyaniline is casted on the substrate, while heating the substrate to evaporate off the solvent. By such a method, the wetting properties of the substrate is enhanced, and the spring off of the polyaniline solution on the substrate are prevented, and the polyaniline solution can be uniformly coated, and thus, a uniform polyaniline thin film can be easily obtained. It is preferable that the substrate is heated in such an extent that its surface temperature is at 80° to 120° C., or preferably, in the range of 90° to 100° C.

Also, according to the present invention, in the case when a solvent soluble polyaniline is casted to form a film or a thin film, a uniform polyethylene thin film can be easily obtained by first subjecting the substrate to sputter etching, in a range where the discharge treatment amount is defined as the product of the treating power density and the treating time is 0.1 to 50 W second/cm$^2$, or preferably, in the range of 1 to 30 W second/cm$^2$. The solvent soluble polyaniline is then cast on the surface of such a substrate, and then the solvent is evaporated off. In particular, this method is preferable when a fluorine resin film is used as the substrate.

The sputter etching treatment is effected, in general, at a room temperature. The frequency of the high frequency power used may be over the range of several hundred KHz to several ten MHz, but in practice, it is preferable that 13.56 MHz, which is the industrial allotment frequency, is used. The distance between the electrodes is determined to be proportional to the reciprocal number of the square root of the atmospheric pressure, as for example, when the atmospheric pressure is 0.005 Torr, as more than 30 mm. Although air and steam are generally used as the atmosphere, other than those, inert gases such as nitrogen, argon, helium, etc., and carbon dioxide gas, etc., are used. On the substrate subjected to the sputter etching treatment as described above, for example, on the surface of a fluorine resin molded product, are formed active polar groups such as the carboxyl group, aldehyde group, hydroxide group, etc., and the wetting properties for an organic solvent are remarkably improved.

Heretofore, as the means for improving the wetting properties of the fluorine resin molded product such as films, membranes, etc., various techniquies are known such as the corona discharge, plasma treatment, chemical treatment, etc., but by means of these treatments, the wetting properties of the surface of the fluorine resin molded product to the polyaniline solution can almost not be improved. However, as described above, by letting the surface of the fluorine resin product be first subjected to the sputter etching treatment, or by improving the wetting properties of the surface of the fluorine resin molded product to the polyaniline solution, the polyaniline solution can be uniformly coated on the surface of a fluorine resin molded product, and thus, a uniform polyaniline thin film can be obtained on the surface of a fluorine resin molded product.

The sputter etching treatment is described, for example, in the official publication of Japanese Patent Application No. 22108/1978, etc., and is already well known, a treatment for applying high frequency voltage between the negative and positive electrodes under a reduced pressure atmosphere in a pressure resistive vessel, to accelerate positive ions formed by discharge and let them collide to the surface of the molded product on the negative electrode. The equipment for this treatment is constituted as such that the negative electrode and the positive electrode are arranged in the pressure resistive vessel in a counterposed manner, and the negative electrode is connected to the high frequency power source via an impedance adjustor, and the positive electrode is connected to the earth side of the high frequency power source. In the outside of the negative electrode is arranged a shield electrode, and is kept at the earth potential. The molded products can be treated in any of the batch system and the continuous system depending on the conditions of the equipment. As such equipment can be used, for example, as described in the official publication of Japanese Patent Application No. 1387/1981 and No. 1338/1981, etc.

Further, from the above-described solvent soluble aniline oxidative polymer according to the present invention, a heat-proof fibre can be obtained by extruding its solution from a spinning nozzle, and by removing the solvent therefrom by heating and drying, and when it doped with a protonic acid a conducting fibre can be obtained.

As described above, since the aniline oxidative polymer in the undoped state according to the present invention dissolves well in various solvents, and especially in N-methyl-2-pyrrolidone, and has a far higher molecular weght in comparison with the hitherto known polyaniline, a film strong and having excellent flexibility and heat-proof properties, and without being broken even it is bent, is easily obtained by the casting method. Also, it can be made into a film or a thin film on an appropriate substrate.

Moreover, by doping such a film or a thin film with a protonic acid, a high conducting organic polymer with high strength can be obtained in the same manner. This conducting film has high stability, and can be used, for example, as an anti-electrostatic material and an electromagnetic wave shielding material.

Also, the solvent soluble polymer according to the present invention can be spun into a fibre, and when this is doped, a conducting fibre can be obtained.

Further, the aniline oxidative polymer according to the present invention is soluble in an organic solvent even in a doped state, when it has been doped with an organic acid having the acid dissociation constant pKa value of less than 4.8, or with a certain kind of inorganic acid. Therefore, such a solution can immediately form a thin film of the conducting organic polymer on a substrate by coating it on a suitable substrate, and by removing the solvent.

EXAMPLES

Although the present invention will be explained by referring to Examples, the present invention is not limited in any way by these Examples.

EXAMPLE 1

Production of the conducting organic polymer in a doped state by the oxidative polymerization of aniline In a separable flask of 10 l volume, equipped with a stirrer, a thermometer and a straight tube adapter, is put 6000 g of distilled water, 360 ml of 36% hydrochloric acid, 400 g (4.295 mol) of aniline in this order, and the aniline was dissolved. Separately, to 1493 g of distilled water was added 34 g (4.295 mol) of 97% concentrated sulfuric acid, and mixed to prepare a sulfuric acid aqueous solution. This sulfuric acid aqueous solution was added into the above-described separable flask, and the whole flask was cooled to $-4°$ C. in a low temperature thermostat.

Next, 980 g (4.295 mol) of ammonium peroxo-disulfate was added to 2293 g of distilled water in a beaker, and were dissolved to prepare an oxidizing agent aqueous solution.

The whole flask was cooled in a low temperature thermostat, and while preserving the temperature of the reaction mixture below $-3°$ C., the above-described ammonium peroxodisulfate aqueous solution was gradually dropped from the straight tube adapter into an acidic solution of an aniline salt in a rate of 1 ml/min by use of a tubing pump. At first, the color-less transparent solution changed its color in accordance with the progress of polymerization, from greenish blue to blackish green, and successively, a blackish green colored powder separated out.

Although temperature rise was detected in the reaction mixture in the time of this powder precipitation, in order to obtain the high molecular weight polymer in this case also, it is important to maintain the temperature in the reaction system at less than $0°$ C., or preferably below $-3°$ C. After the precipitation of the powder, the dropping rate of the ammonium peroxodisulfate aqueous solution may be slightly hastened, such as, for example, to about 8 ml/min. However, in this case also, it is necessary to adjust the dropping rate such as to preserve the temperature below $-3°$ C., while monitoring the temperature of the reaction mixture. Thus, after finishing the dropping of the ammonium peroxodisulfate aqueous solution by spending 7 hours, stirring was continued an additional one hour at the temperature of below $-3°$ C.

The polymer powder obtained was filtered off, washed with water and cleaned with acetone, and dried in vacuum at room temperature to obtain 430 g of blackish green colored polymer powder. This powder was pressed to mold a disk of the size of the diameter of 13 mm, thickness of 700 μm, and its conductivity was measured by the Van der Pauw method to obtain the value of 14 S/cm.

Undoping of a conducting organic polymer with ammonia

Into 4 l of a 2N ammoniacal water was added 350 g of the above-described doped conducting organic powder, and the mixture was stirred in an autohomomixer at the rotation number of 5000 r.p.m. for 5 hours. The color of the mixture changed from blackish green to blueish violet.

The powder was filltered off with a Buchner funnel, and while being stirred in a beaker, was repeatedly washed with distilled water until the filtrate became neutral, and successively was washed with acetone until the filtrate became colorless. Afterwards, the powder was vacuum dried at room temperature for 10 hours to obtain a blackish brown colored undoped polymer powder of 280 g.

This polymer was soluble in N-methyl-2-pyrrolidone, and its solubility was 8 g (7.4%) for 100 g of the same solvent. Also, the intrinsic viscocity [η] measured at $30°$ C. by using the same liquid as a solvent was 1.23 dl/g.

The solubility of this polymer in dimethylsulfoxide and dimethylformamide was less than 1%. In tetrahydrofuran, pyridine, 80% acetic acid aqueous solution, 60% formic acid aqueous solution, and acetonitrile, the polymer was substantially insoluble.

The laser Raman spectrum obtained by irradiating the beam at the exciting wave length of 457.9 nm to a sample formed of the powder of polyaniline in the undoped state and molded in a disk-like shape is shown in FIG. 1. For comparison's sake, the laser Raman spectrum obtained by irradiating the beam at the exciting wave length of 457.9 nm on the polyaniline of the undoped state, and shown in Y. Furukawa et al., Synth. Met., 16, 189 (1986) is shown in FIG. 2. This polyaniline had been the one obtained by the electrochemical oxidative polymerization of aniline on a platinum electrode.

Also, the result of the measurement of Raman spectrum in the range of 1400 to 1700 $cm^{-1}$ by changing the wave length of the laser exciting beam is shown in FIG. 3. Accompanying the change of the exciting wave length from 488.0 nm to 476.5 nm to the short wave side, the ratio Ia/Ib changed, and at 457.9 nm, it became more than 1.0, and in comparison with the case of 488.0 nm, it was seen that the strength ratio Ia/Ib was reversed.

Further, an electronic spectrum is shown in FIG. 4.

Next, the GPC measurement was carried out on the above-described organic solvent soluble polyaniline by using the GPC column for use with the N-methyl-2-pyrrolidone. As the column the one made by connecting 3 kinds of columns for use with N-methyl-2-pyrrolidone was used. Also, as an eluent was used the N-methyl-2-pyrrolidone solution of lithium bromide of the concentration of 0.01 mol/l was used. The result of the GPC measurement is shown in FIG. 5.

From this result, it was found that the above-described organic solvent soluble polyaniline had the number-averaged molecular weight of 23,000 and the weight-averaged molecular weight of 160,000 both values are converted to the polystyrene standard).

In the same manner, solvent soluble polyanilines having different intrinsic viscocities [η] measured at 30° C. in N-methyl-2-pyrrolidone were obtained by changing reaction conditions in various ways. The intrinsic viscocity [η] and the number-averaged molecular weight and the weight-averaged molecular weight are shown in Table 1.

TABLE 1

| Intrinsic viscocity [η] [dl/g] | Molecular weight by GPC | |
|---|---|---|
| | Number averaged molecular weight | Weight averaged molecular weight |
| 0.40 | 10000 | 48000 |
| 0.48 | 12000 | 120000 |
| 0.56 | 14000 | 130000 |
| 0.76 | 18000 | 140000 |
| 1.23 | 23000 | 160000 |

EXAMPLE 2

Preparation of a free standing film by use of a soluble aniline oxidative polymer Five grams of the undoped aniline oxidative polymer obtained in Example 1 were added into 95 g of N-methyl-2-pyrrolidone in each small amount, and was dissolved at room temperature to obtain a blackish blue colored solution. This solution was vacuum filtered with a G3 glass filter to obtain the insoluble matter residue on the filter in an extremely small amount. This filter was washed with acetone, and after drying the residual insoluble matter, the weight of the insoluble matter was measured to be 75 mg. Therefore, the soluble part of the polymer was 98.5%, and the insoluble matter was 1.5%.

The polymer solution obtained in such a manner as described above was casted on a glass plate by means of a glass rod, and the N-methyl-2-pyrrolidone was evaporated off in a hot wind circulating drier at 160° C. for two hours. Subsequently, by immersing the glass plate in cold water, the polymer film was peeled off naturally, and thus, a polymer film of the thickness of 40 μm was obtained.

After cleaning this film with acetone, it was wind dried at room temperature to obtain a copper colored film having metallic lustre.

The strength and solubility of the film are different depending on the drying temperature thereof. When the drying temperature was below 100° C., the film obtained solves in N-dimethyl-2-pyrrolidone in a small amount, and together with that, its strength is also comparatively small. But, the film obtained by heating at a temperature above 130° C. was very strong, and also did not solve into a solvent such as N-methyl-2-pyrrolidone. Also, it did not solve in a concentrated sulfuric acid. It seems that the polymer molecules mutually bridge to each other and become insoluble during the procedure of such heating as described above.

The conductivity of the films in the undoped state and obtained thus was on either case in the order of $10^{-11}$ S/cm.

Also, the film was not broken even if bent for 10,000 times, and its tensile strength was 850 $kg/cm^2$.

EXAMPLE 3

Doping of the free standing film with a protonic acid

After immersing the free standing films obtained in Example 2 in 1N sulfuric acid, perchloric acid, and hydrochloric acid aqueous solution respectively, at room temperature for 66 hours, they were cleaned with acetone and wind dried to obtain a conducting film, respectively.

All films exhibited a concentrated blue color, and the conductivity was, respectively, 9 S/cm, 13 S/cm, and 6 S/cm. Also, the tensile strength of the film doped with perchloric acid was 520 $kg/cm^2$.

EXAMPLE 4

The spectrum and structure of the soluble polymer and the polymer made into an insoluble film, which are both in the undoped state The FT-IR spectra of the powder of the soluble polymer obtained in Example 1 and the insoluble polymer film obtained in Example 2 measured by the KBr method are shown respectively in FIG. 6 and FIG. 7. In the spectrum of the insoluble polymer film obtained in Example 2, the absorption at 1660 $cm^{-1}$ due to the solvent residue, N-methyl-2-pyrrolidone, is a little detected, but since the two spectra are almost the same, it is perceived that there are no large change produced in the chemical structure, although the polymer is made solvent insoluble due to the bridging by the heating and drying of the solvent after the casting of the solvent soluble polymer.

The result of thermogravimetric analysis of the above-described soluble polymer powder and the insoluble film is shown in FIG. 8. Both have high heat resistant properties. Since the insoluble film is not decomposed until up to a higher temperature, and when it is considered that it is insoluble in a concentrated sulfuric acid, it is due to the fact that the polymer molecules are bridged.

Also, the ESR spectrum is shown in FIG. 9. The spin concentration is $1.2 \times 10^{18}$ spin/g in the soluble polymer, and as the heating temperature is increased, the spin concentration becomes higher, which shows that radicals are formed by the heating. It seems that the polymer is bridged due to the coupling of the radicals and the heated film becomes insoluble.

Next, the results of elemental analysis on the soluble polymer and insoluble polymer will be shown in the following.

Soluble polymer:
C, 77.19; H, 4.76; N, 14.86 (total 96.81).
Insoluble polymer:
C, 78.34; H, 4.99; N, 15.16 (total 98.49).

On the basis of this elemental analysis, the composition formula of the soluble polymer normalized at C12.00 is $C_{12.00}H_{8.82}N_{1.98}$, and the composition formula of the insoluble polymer is $C_{12.00}H_{9.11}N_{1.99}$. On the other hand, the quinonediimine structural unit and the phenylenediamine structural unit normalized at C12.00 in the same manner are respectively as follows.

quinonediimine structural unit $C_{12}H_8N_2$
Phenylenediamine structural unit $C_{12}H_{10}N_3$ Accordingly, both the soluble polymer and the solvent insoluble polymer are, as described above, the polymers having the quinonediimine structural unit and phenylenediamine structural unit as the main repeating units.

Next, the reflective spectra in the visual to near infrared region of the film of undoped state obtained in Example 2 and the film doped with perchloric acid are respectively shown in FIG. 10. In the undoped state almost all the near infra-red rays are reflected, but after doping, the near infra-red rays are absorbed, and it is noted that there is almost no reflection. This is based on the absorption due to the polaron or the hiperpolaron which brings about the conductivity formed by the doping of a protonic acid.

Also, by carrying out the doping of the film in the undoped state with perchloric acid, the ESR absorption is increased to a large extent and the spin concentration reaches even up to $3.8 \times 10^{21}$ spin/g. This is due to the semi-quinone radical as the polaron formed.

EXAMPLE 5

The polymer films obtained in Example 2 were immersed in a protonic acid aqueous solutions or alcoholic solutions having various pKa values to examine the advisability of the doping. The conductivity of polymer films obtained by doping protonic acids having various pKa values are shown in Table 2. It is shown that the protonic acids having pKa values of less than 4.8 are effective for the doping of the polymer.

TABLE 2

| Dopant | pKa | Conductivity (S/cm) |
|---|---|---|
| Hydrocloric acid[a] | 0.47 | 6 |
| p-Toluene sulphonic acid[a] | (0.7)[d] | 3.1 |
| Oxalic acid[b] | 1.23 | 1.9 |
| Dichloroacetic acid[a] | 1.48 | 0.5 |
| Malonic acid[a] | 2.78 | 1.4 |
| Monochloroacetic acid[a] | 2.85 | $1.7 \times 10^{-2}$ |
| Malic acid[a] | 3.4 | $8.5 \times 10^{-2}$ |
| p-Nitro-benzoic acid[b] | 3.46 | $3.7 \times 10^{-4}$ |
| Formic acid[c] | 3.75 | $2.1 \times 10^{-2}$ |
| Acrylic acid[c] | 4.25 | $4.8 \times 10^{-2}$ |
| Acetic acid[c] | 4.75 | $3.7 \times 10^{-2}$ |

TABLE 2-continued

| Dopant | pKa | Conductivity (S/cm) |
|---|---|---|
| Propionic acic[c] | 4.88 | $4.1 \times 10^{-11}$ |

(Note)
[a]Doping with 1 N aqueous solution
[b]Doping with 1 N alcoholic solution
[c]Doping with 100% solution (solventless)
[d]The value of benzenesulphonic acid

EXAMPLE 6

Production of transparent conducting thin film composite body

An N-methyl-2-pirrolidone solution of 0.5% by weight of the soluble polymer powder obtained in Example 1 was prepared, and after it was coated on a polyethylene terephthalate film of the thickness of 75 $\mu$m, the film was dried at 150° C. for 1 hour. After doping the film obtained by immersing it in an 1 N perchloric acid aqueous solution for 3 hours, it was washed with acetone and was wind dried.

The composite film was cut in squares, and a silver paste was coated on the two peripheral sides mutually counterposed, and the surface resistance was measured to get the value of 3.5M/cm$^2$. Also, the conductivity was 0.02 S/cm. As a result of observation of the sectional surface of this composite film using transmissive type electron microscope photography the thickness of the aniline oxidative polymer film was found to be about 0.1 $\mu$m.

Also, the surface resistance of this film changed little even in vacuum, or under the low humidity of the globe box replaced with argon (dew point of −37° C., humidity 180 ppm).

EXAMPLE 7

Production of a conductive organic polymer of the de-doped state by the oxidative polymerization of aniline Into a separable flask of 1 l volume. equipped with a stirrer, a thermometer, and a dropping funnel, were put 450 g of distilled water, 30 ml of 6% hydrochloric acid, and 30 g (0.322 mol) of aniline in this order, and the aniline was dissolved. Separately, 32 g of a 97% concentrated sulfuric acid (0.32 mol) were added to the 112 g of distilled water in the beaker while cooling with ice water, and the mixture was mixed to prepare a sulfuric acid aqueous solution. This sulfuric acid aqueous solution was added into the above-described separable flask, and the whole flask was cooled down to the temperature of less than 5° C. with ice water.

Next, 73.5 g (0.322 mol) of ammonium peroxodisulfate was added to distilled water in a beaker, and was dissolved to prepare an oxidizing agent aqueous solution.

The whole flask was cooled in a low temperature thermostat, and while preserving the temperature of the reaction mixture below −3° C., the above-described ammonium peroxodisulfate aqueous solution was gradually dropped onto the aqueous solution of the aniline salt under stirring expending 105 minutes. At first, the colorless transparent solution changed its color from greenish blue to blackish green, and successively, blackish green colored powder was separated. After finishing the dropping of the ammonium peroxodisulfate aqueous solution, stirring was continued for further 45 minutes at the temperature of −3° C.

A part of the polymer powder obtained was taken to wash with water and acetone, and was vacuum dried at room temperature, and a blackish green polymer powder was obtained. The powder was pressed to form a disk of the size of diameter of 13 mm, and the thickness of 700 μm, the conductivity of which was measured on its to obtain the value of 18 S/cm.

Undoping of the conducting organic polymer by use of ammonia

To the reaction mixture containing the above-described doped conducting organic polymer powder in a flask was added 150 ml of 25% ammoniacal water, and was stirred under cooling for 1.5 hours. The color of the reaction mixture changed from blackish green to bluish violet.

The powder was filtered through a Buchner funnel, and while stirring in a beaker, was repeatedly washed with distilled water until the filtrate became neutral, and successively, was washed with acetone until the filtrate became colorless. Afterwards, the powder was vacuum dried at room temperature for 10 hours to obtain 22.5 g of violet colored undoped polymer powder.

This polymer was soluble in N-methyl-2-pyrrolidone, and its solubility was 8 g (7.4%) to 100 g of the same solvent. Also, its intrinsic viscosity [η] measured at 30° C. by use of the same solvent was 1.20.

The solubility of this polymer in dimethyl sulfoxide and dimethylformamide was less than 1%.

The polymer was not substantially soluble in tetrahydrofuran, pyridine, 80% acetic acid aqueous solution, 60% formic acid aqueous solution, and acetonitrile.

EXAMPLE 8

Preparation of the free-standing film by use of the soluble aniline oxidative polymer Five grams of undoped aniline oxidative polymer powder obtained in Example 7 was very gradually added into 950 g of N-methyl-2-pyrrolidone, and was dissolved at room temperature, and a blackish blue solution was obtained. When this solution was vacuum filtered with a G3 glass filter, the insoluble matter remaining on the filter were extremely small. This filter was washed with acetone, and after drying the remained insoluble matter, its weight was measured to obtain the value of 75 mg. Therefore, 98.5% of the polymer was dissolved, and the insoluble matter was 1.5%.

The polymer solution thus obtained was casted on a glass plate by use of a glass rod, and was dried in a hot air circulating drier at 160° C. for 2 hours to evaporate off N-methyl-2-pyrrolidone. Afterwards, by immersing the glass plate in cold water, the polymer film was naturally peeled of and a polymer film of the thickness of 40 μm was obtained.

After washing this film with acetone, it was dried in air at room temperature to obtain a copper-colored film having metallic lustre.

The film shows different strength and solubility depending on the drying temperature thereof. When the drying temperature is less than 100° C., the film obtained is slightly soluble in N-methyl-2-pyrrolidone, and together with that, its strength is comparatively small. However, the film obtained at a temperature higher than 130° C. is very strong, and does not dissolve in N-methyl-2-pyrrolidone and in other organic solvents. Also, it does not dissolve in sulfuric acid. It seems that, when the film is heated at a high temperature, the polymer molecules cross-link to each other during the procedure, and become insoluble.

The film in the undoped state thus obtained had conductivity in each them of the order of $10^{-10}$ S/cm.

Also, the film was not broken by bending it even for 10,000 times, and its tensile strength was 840 kg/cm$^2$.

Next, results of the elemental analysis on the soluble polymer and insoluble polymer will be shown in the following.

Soluble polymer: C, 77.97; H, 5.05; N 14.68 (total 97.70).

Insoluble polymer: C, 78.31; H, 5.38; N 15.31 (total 99.00).

The composition formula of the soluble polymer normalized to C 12.00 on the basis of this elementary analysis is $C_{12.00}H_{9.26}N_{1.94}$ and that of the insoluble polymer is $C_{12.00}H_{9.82}N_{2.01}$. On the other hand, quinonediimine structural unit and phenylene diamine structural unit normalized in the same way to C 12.00 are respectively as follows:

Quinonediimine structural unit $C_{12}H_3N_2$
Phenylenediamine structural unit $C_{12}H_{10}N_2$ Therefore, both the soluble polymer and solvent insoluble polymer are polymers having quinonediimine structural units and the phenylenediamine structural unit as the main repeating units.

EXAMPLE 9

Production of a conducting polyaniline thin film

After preparing an N-methyl-2-pyrrolidone solution of 0.5% of the solvent soluble polyaniline powder prepared in Example 7, and after coating it in a thin film-like form on a glass plate (5 cm×1 cm) by the spin coat method (1500 r.p.m. for 30 seconds), the plate was heat dried at 150° C. for 1 hour to obtain a thin film having the thickness of about 300 Å.

On this thin film were formed silver paste coatings of the length of 10 mm at 2 mm intervals, and a copper wire was connected to the silver paste, and the surface resistance was measured to obtain the value of $10^{13}$ to $10^{14}$ Ω/□.

Successively, after immersing the polyaniline thin film obtained on a glass plate in a polyvinylsulphonic acid aqueous solution of pH 1 at room temperature for 15 hours, it was dried at room temperature to obtain a doped conducting polyaniline thin film. The surface resistance thereof was measured in the same manner as described above, to obtain the value of $9.0 \times 10^5$ Ω/□. This product was washed with distilled water of pH 6, and further immersed in distilled water for 15 hours to obtain the surface resistance of $4.6 \times 10^8$ Ω/□.

Also, when the conducting polyaniline thin film was washed with methanol in place of distilled water, and further immersed in methanol for 3 hours, the surface resistance was $2.8 \times 10^5$ Ω/cm2.

COMPARATIVE EXAMPLE 1

After immersing the pre-doping polyaniline thin film obtained in Example 9 in a hydrochloric acid of pH 1 for 15 hours, it was dried at room temperature to obtain a doped conducting polyaniline thin film. The surface resistance thereof was $8.5 \times 10^6$ Ω/□. This film was washed with distilled water of pH 6, and when it was further immersed in distilled water for 15 hours, the surface resistance thereof increased to $3.2 \times 10^{14}$ Ω/□.

Also, when the conducting polyaniline thin film was washed with methanol in place of distilled water, and was further immersed in methanol for 3 hours, the surface resistance rose up to $4.5 \times 10^{14}$ Ω/□.

COMPARATIVE EXAMPLE 2

After immersing the pre-doped polyaniline thin film obtained in Example 9 in a sulfuric acid aqueous solution of pH 1 for 15 hours, it was dried at room temperature to obtain a doped conducting polyaniline thin film. The surface resistance thereof was $2.2 \times 10^6$ Ω/□. The film was washed with distilled water of pH 6, and when it was further immersed in distilled water for 15 hours, the surface resistance rose up till to $7.6 \times 10^{13}$ Ω/□.

Also, the conducting polyaniline thin film was washed with methanol in place of distilled water, and when it was further immersed in methanol for 3 hours, the surface resistance rose up till to $3.0 \times 10^{13}$ Ω/□.

EXAMPLE 10

After immersing the polyaniline free-standing film obtained in Example 8 in a polyvinyl sulfonic acid aqueous solution of pH 0.5 for 24 hours at room temperature, it was dried at room temperature to obtain a doped conducting polyaniline film. The conductivity thereof was 2.83 S/cm. It was refined by washing with distilled water of pH 6, and when it was further immersed in distilled water for 16 hours, the conductivity was 1.52 S/cm.

COMPARATIVE EXAMPLE 3

After immersing the polyaniline free-standing films obtained in Example 8 in various protonic acid aqueous solutions for 24 hours, it was dried at room temperature to obtain doped conducting polyaniline films. The conductivity thereof is shown in Table 3. Also, these conducting films were refined by washing with distilled water of pH 6, and the conductivity thereof after further immersion in distilled water for 16 hours are each shown in Table 3.

Contrary to that of the conducting film in which was used polyvinyl sulfonic acid as a dopant, after being immersed in distilled water the conducting film showed remarkable lowering of the conductivity.

|  | Dopant | Conductivity (S/cm) | |
|---|---|---|---|
|  |  | After immersion in protonic acid aqueous solution | After washing |
| Example 10 | Polyvinyl sulfonic acid | 2.83 | 1.52 |
| Comparative Example 3 | Perchloric acid | 0.53 | 0.004 |
|  | Trifluoroacetic acid | 2.36 | 0.08 |
|  | Hydrochloric acid | 3.10 | 0.10 |
|  | Sulfuric acid | 3.43 | 0.13 |
|  | 1,2-Ethanedisulfonic acid | 3.85 | 0.53 |
|  | Phosphoric acid | 4.77 | 0.03 |
|  | 2-Acrylamide-2-methyl-propane sulfonic acid | $2.3 \times 10^{-7}$ | $6.0 \times 10^{-10}$ |
|  | Polyphosphoric acid | 0.11 | 0.015 |
|  | Polyvinylsulfonic acid | 2.55 | 0.24 |
|  | Polystyrenesulfonic acid | 3.01 | 0.13 |
|  | Polyallylsulfonic acid | $1.8 \times 10^{-6}$ | $5.2 \times 10^{-8}$ |

EXAMPLE 11

After immersing the polyaniline free-standing film obtained in Example 8 in a polyvinyl sulfonic acid aqueous solution of pH 0.5 for 24 hours, it was dried at room temperature to obtain a doped conducting polyaniline film. The conductivity thereof was 3.21 S/cm. The film was refined by washing with distilled water of pH 6, and was further immersed in distilled water for 288 hours. The conductivity thereof was 0.10 S/cm.

COMPARATIVE EXAMPLE 4

After immersing the polyaniline free-standing film obtained in Example 8 in a hydrochloric acid aqueous solution of pH 0.5 for 24 hours, it was dried to obtain a doped conducting polyaniline film. The conductivity thereof was 2.68 S/cm. The film was refined by washing with distilled water of pH 6, and further, it was immersed in distilled water for 288 hours. The conductivity was 0.0013 S/cm.

COMPARATIVE EXAMPLE 5

After immersing the polyaniline free-standing film obtained in Example 8 in a sulfuric acid aqueous solution of pH 0.5 for 24 hours, it was dried at room temperature to obtain a doped conducting polyaniline film. The conductivity thereof was 2.32 S/cm.

The film was refined by washing with distilled water of pH 6, and was further immersed in distilled water for 288 hours, the conductivity thereof was 0.020 S/cm.

EXAMPLE 12

An N-methyl-2-pyrrolidone solution of 0.5% by weight of solvent soluble polyaniline obtained in Example 7 was prepared.

An aluminium plate and a glass plate were stacked up on a hot plate, and a polyethylene terephthlate film of the thickness of 80 μm was mounted thereon, and the surface temperature thereof was made to be 100° C. On the surface of this film was dropped the above-described polyaniline solution, and was casted by use of an applicator. The solvent evaporated off rapidly from the polyaniline solution and a uniform polyaniline film was formed.

After heating this film at 130° C. for 1 hour, it was immersed in a perchloric acid aqueous solution and was refined by washing with acetone, and afterwards, was further dried at 130° C. for 1 hour to obtain a doped film.

This film had the thickness of 0.02 μm, the surface resistance of $1.3 \times 10^{11}$ Ω/□, optical transmittance of 87%, and charged charge half reduction period of 9.0 seconds.

EXAMPLE 13

An N-methyl-2-pyrrolidone solution of 1% by weight of the solvent soluble polyaniline obtained in Example 7 was prepared.

In the same manner as in Example 12, the surface temperature of the polyethylene terephthalate film was made as 90° C., and the above-described polyaniline solution was dropped on the surface of the film to be casted by use of an applicator. The solvent was rapidly evaporated off from the polyaniline solution, and a uniform polyaniline film was formed.

After heating this film at 130° C. for 1 hour, it was immersed in a polyvinyl sulfonic acid aqueous solution and washed with acetone, and afterwards, it was again dried at 130° C. for 1 hour to obtain a doped film.

This film had the thickness of 0.05 μm, surface resistance of $8.2 \times 10^8$ Ω/□, light transmittance of 84%, and charged charge half reduction period of 1.3 seconds.

EXAMPLE 14

An N-methyl-2-pyrrolidone solution of 3% by weight of the solvent soluble polyaniline obtained in Example 7 was prepared.

In the same manner as in Example 12, the surface temperature of the polyethylene terephthalate film was made to be 90° C., and the above-described polyaniline solution was dropped on the surface of the film to be casted by use of an applicator. The solvent rapidly evaporated off from the polyaniline solution, and a uniform polyaniline film was formed.

After heating this film at 130° C. for 1 hour, it was immersed in a polyvinylsulfonic acid aqueous solution and washed with acetone, and subsequently, it was again dried at 130° C. for 1 hour to obtain a doped film.

This film had the thickness of 0.075 μm, surface resistance of $3.5 \times 10^6$ Ω/□, light transmittance of 82%, and charged charge half reduction period of 0.05 second.

EXAMPLE 15

An N-methyl-2-pyrrolidonesolution of 0.5% by weight of the solvent soluble polyaniline obtained in Example 1 was prepared.

Steam was introduced into a pressure resistant vessel under the reduced atmosphere of $1 \times 10^{-3}$ Torr to make the pressure in the vessel $5 \times 10^{-2}$ Torr, and sputter etching treated a polyethylene terephthalate film of the thickness of 80 μm in such a manner as the charging treatment amount became 3 W second/cm$^2$. When this film was immersed into water, it was ascertained that the whole surface was wetted by water.

The above-described polyaniline solution was dropped on this film and casted by use of an applicator to obtain a uniform film. After heating this film at 130° C. for 1 hour, it was immersed in a perchloric acid aqueous solution and was washed with acetone, and subsequently, the film was again dried at 130° C., and a doped film was obtained.

The surface resistance of this film was $3.0 \times 10^8$ Ω/cm$^3$.

EXAMPLE 16

An N-methyl-2-pyrrolidone solution of 2% by weight of the solvent soluble polyaniline obtained in Example 7 was prepared.

Steam was introduced into a pressure resistant vessel under the reduced atmosphere of $1 \times 10^{-3}$ Torr to make the pressure in the vessel be at $7 \times 10^{-2}$ Torr, and sputter etching treatment was carried out on a polytetrafluoroethylene film of the thickness of 50 μm in such a manner as that the discharge treatment amount became 20 W second/cm$^2$. When this film was immersed in water, it was ascertained that the whole surface was wetted with water.

The above-described polyaniline solution was dropped on this film and was casted by use of an applicator, and a uniform film was obtained. After heating this film at 130° C. for 1 hour, it was immersed in a perchloric acid aqueous solution and washed with acetone, and subsequently, it was again dried at 130° C. for 1 hour, and a doped film was obtained.

The surface resistance of this film was $2.0 \times 10^6$ Ω/□.

EXAMPLE 17

An N-methyl-2-pyrrolidone solution of 2% by weight of the solvent soluble polyaniline obtained in Example 1 was prepared.

Steam was introduced into a pressure resistant vessel under the reduced pressure atmosphere of $1 \times 10^{-3}$ Torr to make the pressure in the vessel be $5 \times 10^{-2}$ Torr, and sputter etching treatment was carried out on the tetrafluoroethylene-hexafluoro propylene copolymer film in such a manner as that the discharge treatment amount became 10 W second/cm$^2$.

When this film was immersed in water, it was ascertained that the whole surface was wetted with water.

The above-described polyaniline solution was dropped on this film and was casted by use of an applicator, and a uniform film was obtained. After heating this film at 130° C. for 1 hour, it was immersed in a perchloric acid aqueous solution and was washed with acetone, and subsequently, it was again dried at 130° C. for 1 hour to obtain a doped film.

The surface resistance of this film was $5.0 \times 10^5$ Ω/□.

EXAMPLE 18

After casting an N-methyl-2-pyrrolidone solution of 1% by weight of the solvent soluble polyaniline obtained in Example 7 on a polyethylene terephthalate film of the thickness of 80 μm by use of an applicator, the film was heat dried at 130° C., and a polyaniline film of the thickness of 0.15 μm was obtained.

This film was immersed in a perchloric acid aqueous solution for 30 seconds, and after washing the film with acetone, it was again dried at 130° C. for 1 hour, and a doped film was obtained.

On these compound films, the close adhesive properties, surface hardness, friction wear strength, light transmittance, conductivity and friction charging properties of conducting polyaniline thin films are shown in Table 4.

TABLE 4

| | Example 18 | Example 19 | Example 20 | Example 21 | Comparable Example 6 |
|---|---|---|---|---|---|
| Close adhesive properties | 100 | 100 | 100 | — | 100 |
| Pencil hardness | 3H to 4H | 3H to 4H | 3H to 4H | — | 3H to 4H |
| Light transmittance (%, 640 nm) | 84 | 88 | 82 | — | 70 |
| Wearing properties | 2.7% uprise | 2.3% low down | 2.4% uprise | — | 6.9% uprise |
| Conductivity (S/cm, 24° C., 50% RH) | $1.1 \times 10^{-4}$ | $7.1 \times 10^{-7}$ | $4.2 \times 10^{-4}$ | $3.7 \times 10^{-1}$ | $2.5 \times 10^{-10}$ |
| Friction charging properties (V) | −20 | +1000 | −20 | −4 | +7000 |

In addition, the test methods of the above-described physical properties are as follows:

Close adherence properties:

Checkboard squares are cut on the sample composite film by use of a cutter knife, and a cellophane tape (18 mm width) was pasted thereon, and the tape was peeled off after 3 minutes, and the residual number of measures in 100 measures was evaluated.

Surface hardness:

Pencil hardness (according to JIS K 5401) was adopted. A pencil scratching test material was used, and the evaluation was made by seeing whether the occurrence of flaws is found under a load of 200 g.

Wear strength:

A reciprocal motion wear test machine was used. After shaving the surface for 30 cycles with a grinding paper sheet of #2000, while applying a load of 200 g thereon, the change of light transmittance (wave length 800 nm) was examined.

Light transmittance:

The transmittance in the range (visible light) of the wave length of 400 to 800 nm was measured.

Conductivity:

The four terminal method was adopted.

Friction charge properties:

After strongly rubbing the surface with a gauze for 10 times, the charge voltage was measured.

EXAMPLE 19

In the same manner as in Example 18, a conducting polyaniline film with thickness of 0.15 μm was formed on the polyethyleneterephthalate film, and a composite film was obtained.

The properties of this composite film are shown in Table 4.

EXAMPLE 20

After casting the N-methyl-2-pyrrolidone solution containing 5% by weight of the solvent soluble polyaniline obtained in Example 7 on a polyethyleneterephtalate film of the thickness of 80 μm by use of an applicator, the product was heat dried at 130° C. to obtain a polyaniline film with thickness of 0.3 μm.

After immersing this film in a hydrofluoroboric acid aqueous solution and washed with acetone, it was dried at 150° C. for 1 hour to obtain a doped film.

On this composite film, the close adherence properties of the conducting polyaniline thin film, surface hardness, wear resistance, light transmittance, conductivity and friction charging properties were measured, and the results are shown in Table 4.

EXAMPLE 21

In the same manner as in Example 18 except that a propylene non-woven cloth was used as a substrate, a conducting composite body was obtained. On this composite body, conductivity and friction charging properties were measured, and the results are shown in Table 4.

COMPARATIVE EXAMPLE 6

After casting the N-methyl-2-pyrrolidone solution of 1% by weight of the solvent soluble polyaniline obtained in Example 7 on a polyethylene terephthalate film with thickness of 80 μm by use of an applicator, the product was heat dried at 130° C. to obtain a polyaniline film with thickness of 0.15 μm.

On the composite film with no doping to the film thereafter, the close adhesive properties of the polyaniline thin film, surface hardness, wear strength, light transmittance, conductivity, and friction charging properties were measured, and the results are shown in Table 4.

EXAMPLE 22

The solvent-soluble polyaniline of the undoped state obtained in Example 1 was dissolved in N-methyl-2-pyrrolidone (NMP) together with the protonic acid shown as Table 5 and with an additive, in needed, to prepare a solution.

This solution was coated on a polyethylene terephthalate film by means of the kissroll coat method, and heat dried in a hot wind dryer furnace at 100° C. The surface resistance value of the conducting polyaniline thin film obtained is shown in Table 5. As in the case of determined by number 6, the film thickness of the conducting polyaniline thin film obtained was about 0.08 μm as determined by the observation of the sectional surface by means of the ultrathin film slice method using the transmission type electron microscope.

EXAMPLE 23

The powder (0.5 g) of the solvent-soluble polyaniline in the undoped state was added with stirring into 99.5 g of N-methyl-2-pyrrolidone to dissolve, and a solution of the concentration of 0.5% by weight was prepared.

Separately, as shown in Table 6, a dopant was added to a diluting solvent, and was dissolved. As the diluting solvent acetonitrile, ethylacetate, or were used, as well as other than isopropanol. Also, as the dopant dichloroacetic acid, terephthalic acid, were used, as well as or sulfuric acid, other than malonic acid. Furthermore, since terephthalic acid does not dissolve in the diluting solvent, isopropanol, it was previously dissolved in an N-methyl-2-pyrrolidone solution. As an additive, naphthalene was used.

The dopant (and additive) solution obtained was added to the above-described polymer solution, and was diluted. All of the solution obtained here did not absorb humidity and was stable for a long period.

Successively, this solution was coated on a polyethyleneterephthalate film by means of the kissroll coat method, and was heat dried in a hot air dryer furnace at 100° C. The film thickness and surface resistance value of the conducting polyaniline thin film obtained are shown in Table 6.

In cases when sulfuric acid is used as a dopant, the doped plyaniline precipitates. However, by subjecting the mixture containing the precipitate to ultrasonic wave stirring, a uniform solution can be obtained, and by coating this solution on a substrate and evaporating the solvent be evaporated, a thin film of the conductive organic polymer can be formed on a substrate.

Measurement of the Surface Resistance Value

The sample obtained was cut in 40×40 mm, and two electrodes were arranged in parallel on a thin film of the conducting organic polymer while keeping gaps of 10 mm between them, using a conductive graphite paint to be dried at room temperature. Next, on the graphite-coated film of the sample was attached a golden galvanized clip which was connected to a digital high tester No. 3116 made by Hioki Electric Machine Co., Ltd, and the resistance value was measured. The value obtained was multiplied for 4 times, and the obtained value was taken as the surface resistance.

TABLE 5

| Polyaniline | Dopant | Polyaniline solution composition (% by weight) | | Additive | | NMP | surface resistance | |
|---|---|---|---|---|---|---|---|---|
| 0.5 | malonic acid | 1.0 | | | | 98.5 | $1.1 \times 10^2$ | $(\Omega/\square)$ |
| 0.5 | salicylic acid | 1.3 | | | | 98.2 | $1.7 \times 10^{10}$ | |
| 1.0 | polyacrylic acid (25% aqueous soln.) | 5.5 | | | | 93.5 | $5.0 \times 10^{10}$ | |
| 0.5 | pentadecafluorooctanic acid | 1.1 | | | | 98.4 | $3.5 \times 10^4$ | |
| 0.5 | 1-dodecansulfonic acid (10% aq. soln) | 3.5 | | | | 96.0 | $3.8 \times 10^6$ | |
| 1.0 | p-toluenesulfonic acid monohydrate | 1.1 | | | | 97.9 | $2.2 \times 10^6$ | |
| 0.5 | polystyrenesulfonic acid aq. soln. (pH 0.5) | 4.4 | | triethylamine | 0.15 | 94.95 | $8.3 \times 10^7$ | |
| 0.5 | polyvinylsulfonic acid aq. soln. (pH 0.5) | 4.4 | | triethylamine | 0.15 | 94.95 | $2.2 \times 10^5$ | |
| 0.5 | malonic acid | 1.0 | polyvinyl chloride[a] | 0.5 | | 98 | $4.3 \times 10^5$ | |
| 0.5 | malonic acid | 1.0 | Bylon[b] | 0.5 | | 98 | $5.7 \times 10^6$ | |
| 1.0 | p-toluenesulfonic acid monohydrate | 1.1 | polyvinyl chloride[a] | 1.0 | | 96.9 | $6.8 \times 10^6$ | |
| 1.0 | p-toluenesulfonic acid monohydrate | 1.1 | Bylon[b] | 1.0 | | 96.9 | $2.8 \times 10^6$ | |
| 1.0 | p-toluenesulfonic acid monohydrate | 1.1 | phenylhydrazine | 0.3 | | 97.6 | $7.2 \times 10^6$ | |

(Note)
[a]Sumilitt (trade mark) SX-8G made by Sumitomo Chemical Industry Co., Ltd.
[b]Bylon-200 (saturated polyester resin made by Toyobo Co., Ltd

TABLE 6

| Polymer concentration[a] (weight %) | Composition[b] of diluting solution | | | | Conducting organic polymer thin film | |
|---|---|---|---|---|---|---|
| | N-methyl-2-pyrrolidone | Diluting solvent | naphthalene | dopant | film thickness | surface resistance ($\Omega/\square$) |
| 0.05 | 100 | isopropanol 900 | — | malonic acid 200 | 0.072 μm | 1.5 $10^7$ |
| 0.25 | 100 | isopropanol 100 | — | malonic acid 200 | 0.090 | 3.7 $10^4$ |
| 0.125 | 100 | isopropanol 300 | — | malonic acid 200 | 0.087 | 2.1 $10^5$ |
| 0.083 | 100 | isopropanol 500 | — | malonic acid 200 | 0.085 | 3.7 $10^5$ |
| 0.05 | 100 | isopropanol 900 | 0.5 | malonic acid 200 | 0.073 | 1.0 $10^7$ |
| 0.05 | 100 | acetonitrile 900 | 0.5 | malonic acid 200 | 0.046 | 8.8 $10^8$ |
| 0.05 | 100 | ethylacetate 900 | 0.5 | malonic acid 200 | 0.038 | 3.0 $10^9$ |
| 0.05 | 100 | tetrahydrofuran 900 | 0.5 | malonic acid 200 | 0.038 | 2.9 $10^9$ |
| 0.05 | 100 | isopropanol 900 | — | malonic acid 100 | 0.068 | 7.0 $10^7$ |
| 0.05 | 100 | isopropanol 900 | — | dichloroacetic acid 100 | 0.040 | 2.8 $10^9$ |
| 0.05 | 100 | isopropanol 900 | — | terephthalic acid 100 | 0.035 | 4.3 $10^9$ |
| 0.05 | 100 | isopropanol 900 | — | sulfuric acid 50 | 0.042 | 2.3 $10^9$ |
| 0.05 | 100 | isopropanol 900 | — | sulfuric acid 25 | 0.033 | 5.2 $10^9$ |
| 1.0 | 100 | — | — | p-toluenesulfonic acid 105 | 0.088 | 2.7 $10^5$ |

(Note)
[a]The 1.0% solution was prepared as itself, and a dopant was dissolved in it, and the other ones were at first a 0.5% solution was prepared, which was diluted with the diluting solvent.
[b]The composition is represented in weight parts for N-methyl-2-pyrrolidone, diluting solvent, and naphthalene, and for dopants, in the number of weight parts per 100 weight parts of polyaniline.

BRIEF DESCRIPTION OF DRAWINGS

FIG. 3 shows the laser Raman spectrum in the case where the same aniline oxidative polymer as that in FIG. 1 has been excited with the light of various different exciting wave lengths;

Figure 1:
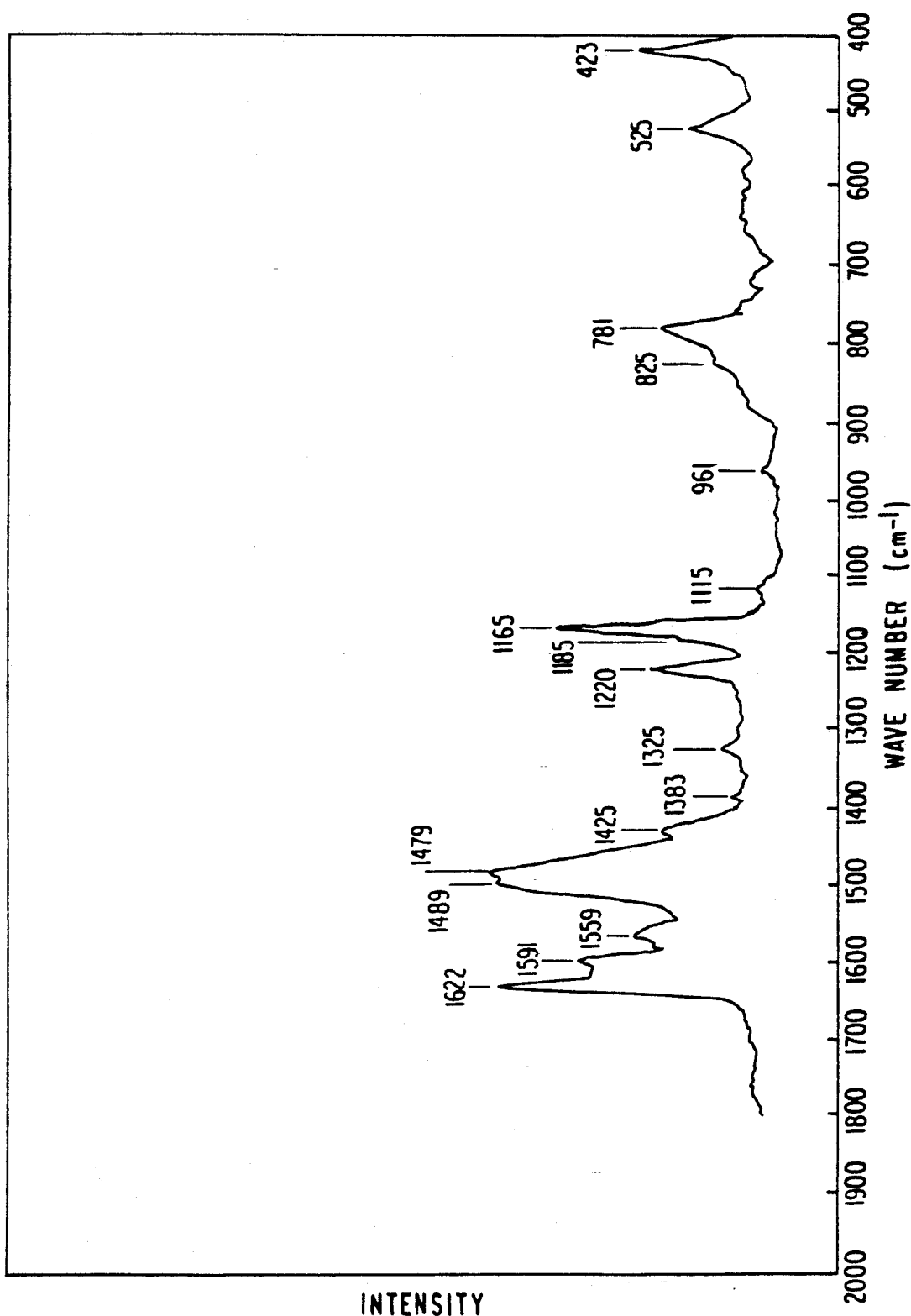
FIG. 1 shows the laser Raman spectrum in the case where the organic solvent soluble aniline oxidative polymer in the undoped state according to the present invention was excited with the light of the wave length of 457.9 nm.
Figure 2:
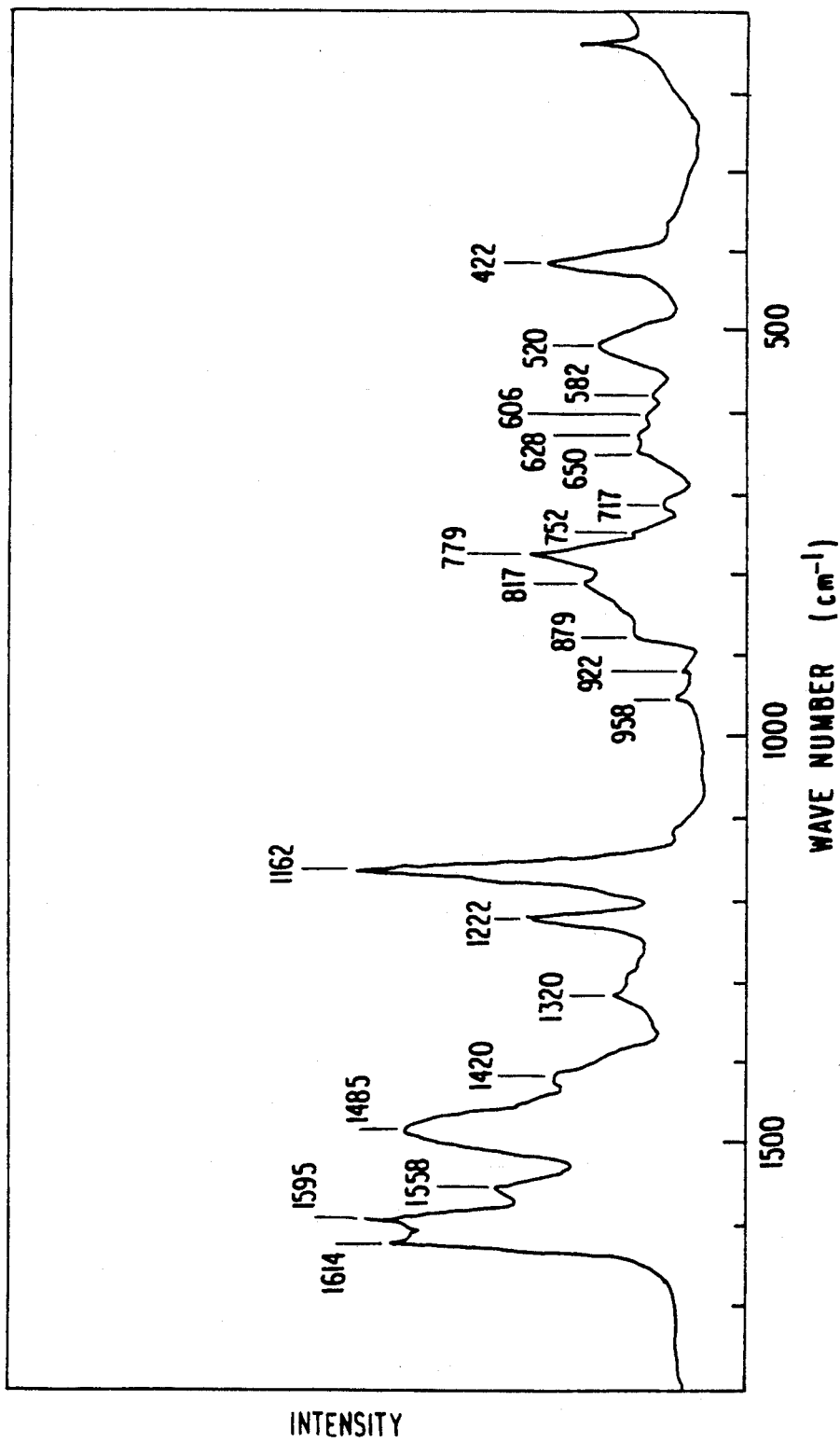
FIG. 2 shows the laser Raman spectrum in the case where the heretofore known polyaniline was excited with the light of the wave length of 457.9 nm.
Figure 5:
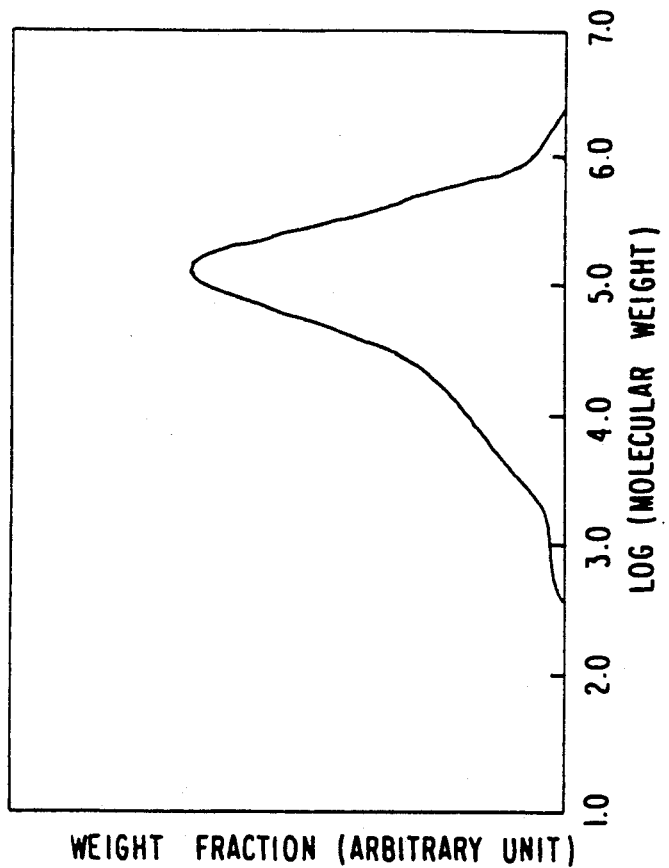
FIG. 5 is a graph for showing the molecular weight distribution measured by means of GPC of the solvent soluble polyaniline according to the present invention.
Figure 4:
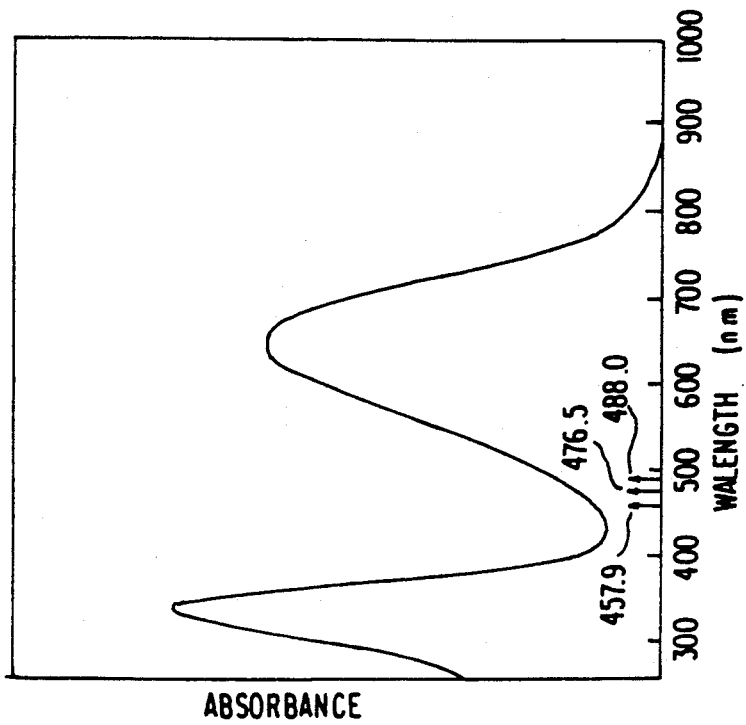
FIG. 4 shows the electronic spectrum of the N-methyl-2-pyrrolidone solution of the solvent soluble aniline oxidative polymer in the undoped state according to the present invention.
Figure 6:
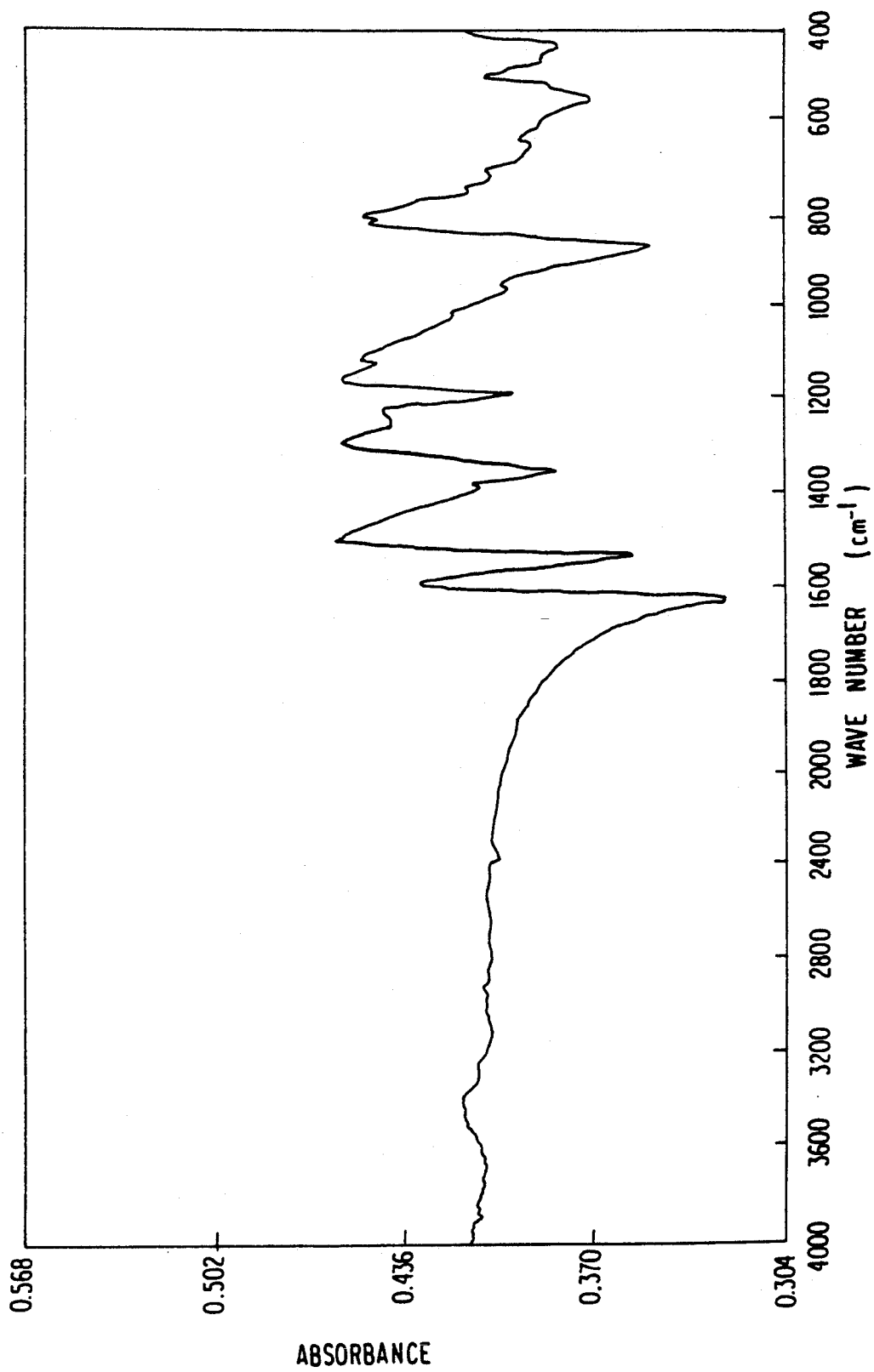
FIG. 6 shows the FT-IR spectrum of the aniline oxidative polymer soluble in the undoped state according to the present invention by means of the KBr disk method.
Figure 7:
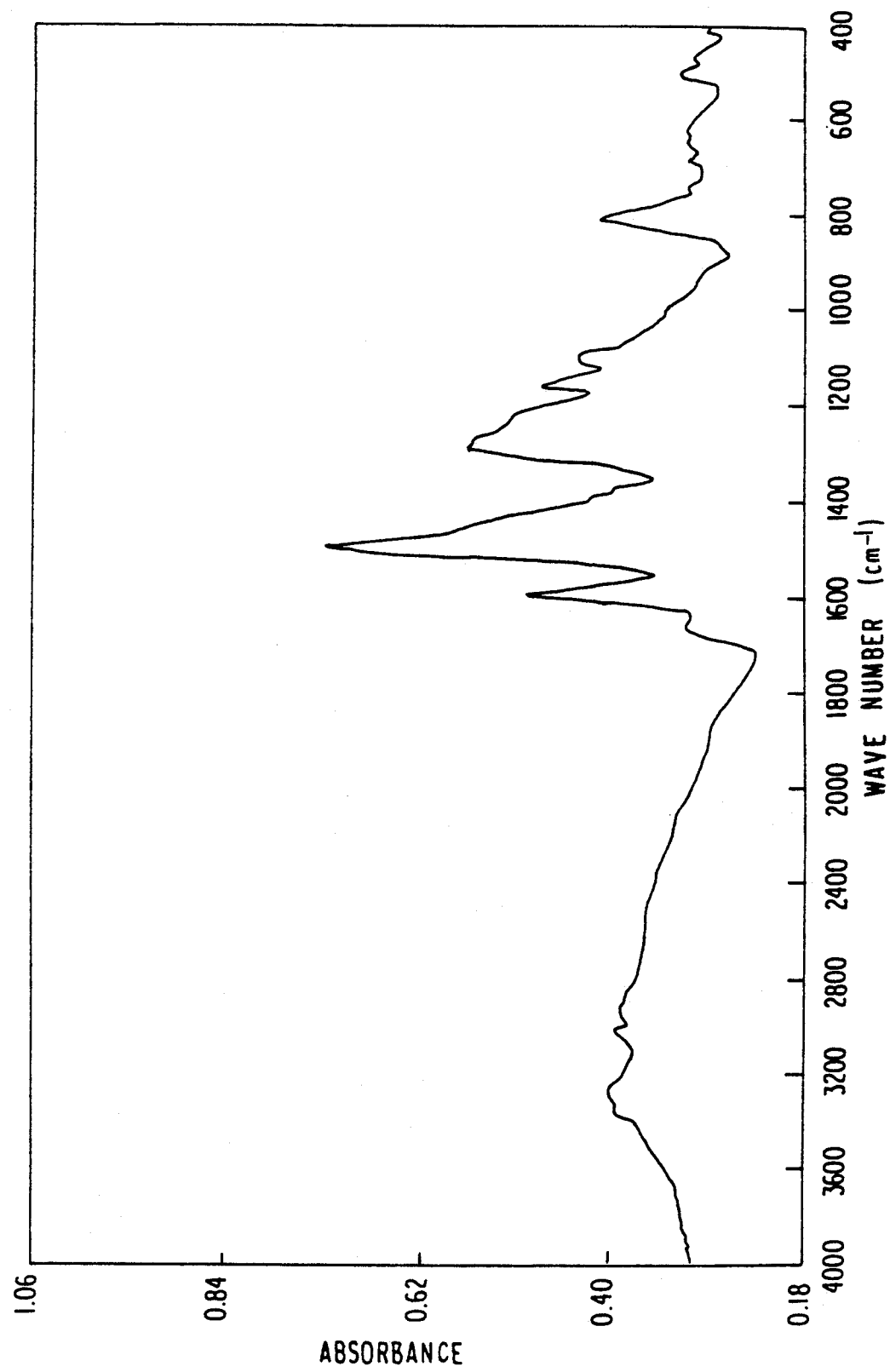
FIG. 7 shows the FT-IR spectrum of the solvent insoluble film obtained by casting the polymer soluble in the above-described solvent by means of the KBr method.
Figure 8:
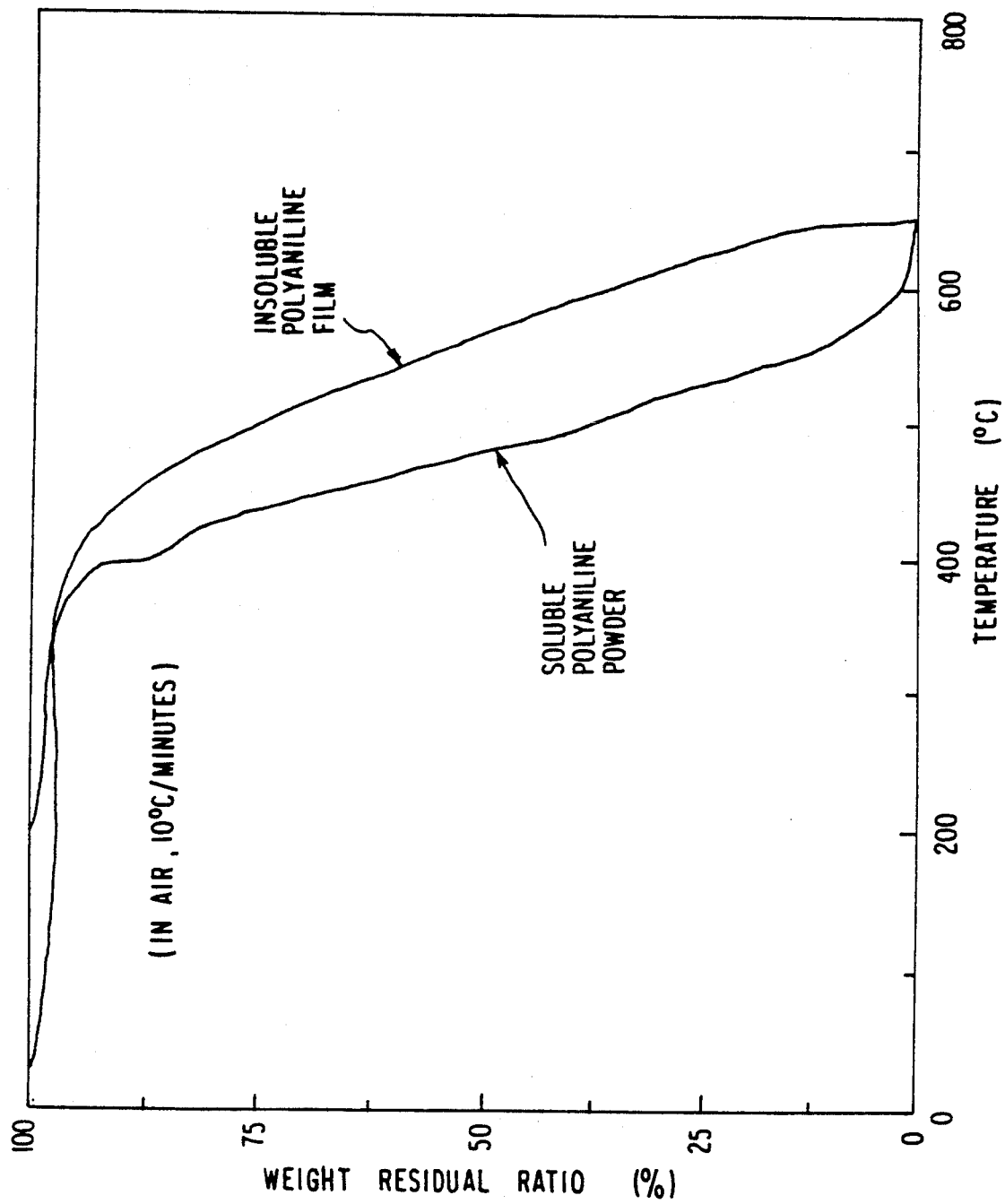
FIG. 8 is a diagram of the thermogravimetric analysis of the above-described soluble polymer and the insoluble polymer film.
Figure 9:
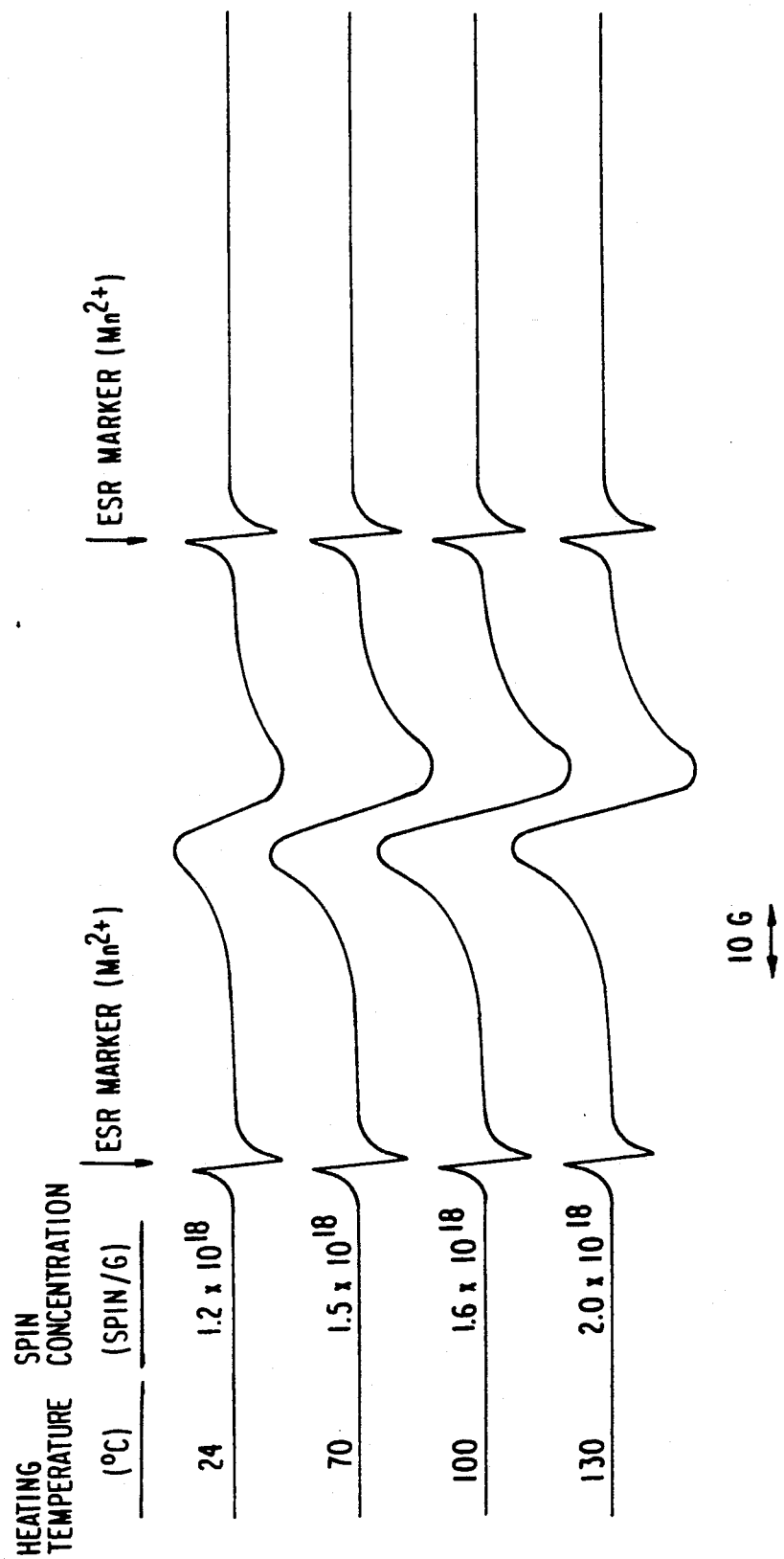
FIG. 9 is a diagram for showing the ESR spectrum change in the case of heating the above-described soluble polymer.
Figure 10:
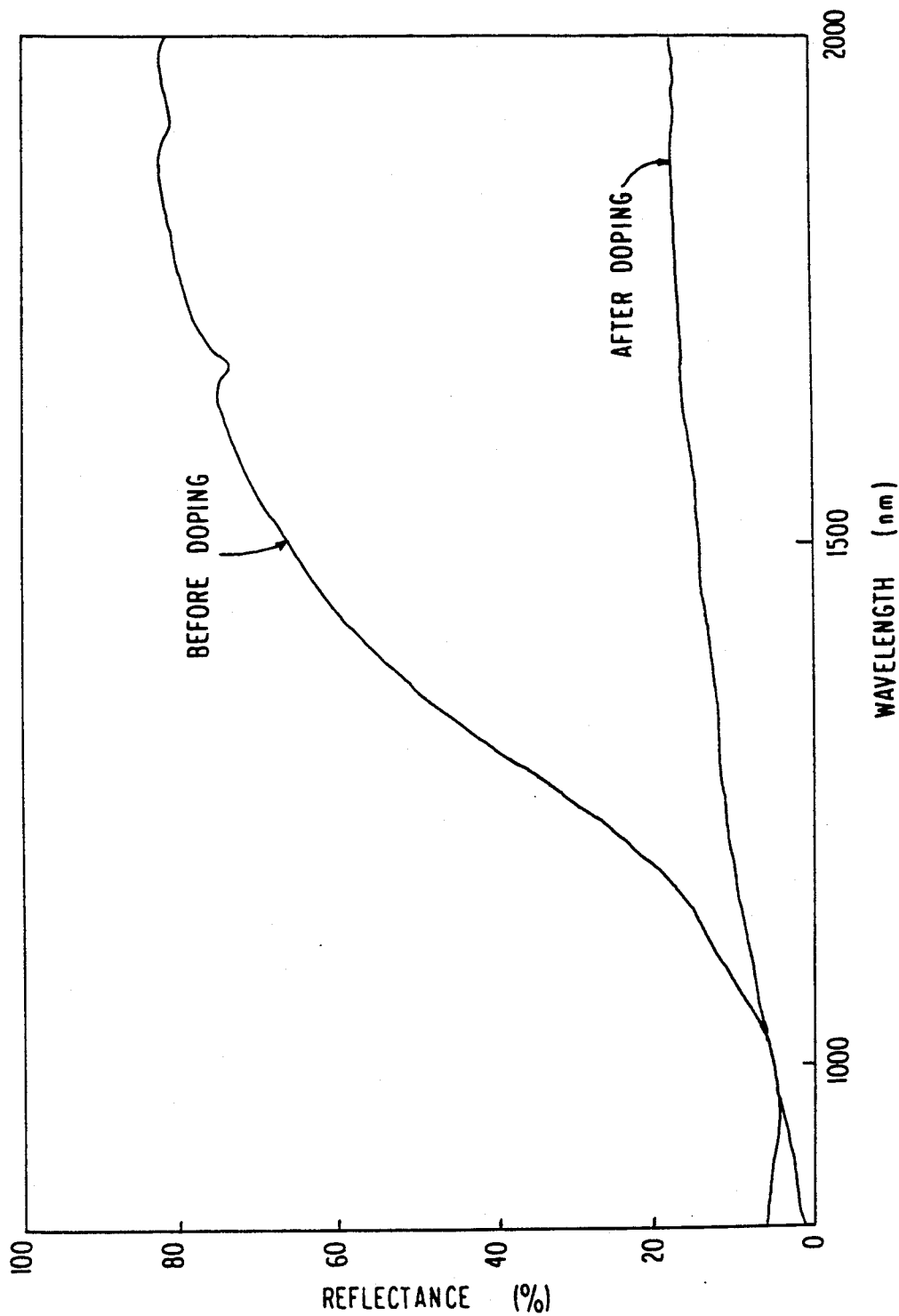
FIG. 10 shows the reflection spectrum of the near infra-red region of the polymer film in the undoped state and the film obtained by doping it with perchloric acid.

While the invention has been described in detail and with reference to specific embodiments thereof it will be apparent to the one skilled in the art that various changes and modifications can be made therein without departing from the spirit and scope of the invention.

What is claimed is:

1. An organic polymer having the main repeating unit represented by the general formula:

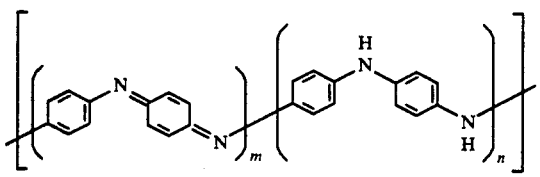

(wherein m and n, respectively, show the molar fraction of the quinonediimine structural unit and phenylenediamine structural unit in the repeating unit, and $0<m<1$, $0<n<1$ and $m+n=1$), and wherein said polymer is soluble in an organic solvent in the undoped state, has the intrinsic viscosity ($\eta$) of more than 0.4 dl/g measured in N-methyl-2-pyrrolidone at 30° C., and wherein, the Raman line intensity ratio of said polymer, Ia/Ib, is greater than 1.0, wherein Ia represents the Raman line intensity of the ring stretching vibration appearing at the wave number higher than 1600 cm$^{-1}$ and Ib represents the Raman line intensity of the ring stretching vibration appearing at the wave number lower than 1600 cm$^{-1}$ in the ring stretching vibration of para-substituted benzene in the laser Raman spectrum obtained by excitation with light of wavelength 457.9 nm.

2. A film formed of an organic polymer having the main repeating unit represented by the general formula:

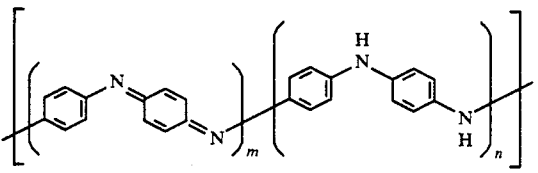

(wherein m and n, respectively, show the molar fraction of the quinonediimine structural unit and phenylenediamine structural unit in the repeating unit, and $0<m<1$, $0<n<1$ and $m+n=1$), and wherein the Raman line intensity ratio Ia/Ib is greater than 1.0. wherein the Raman line intensity Ia represents the ring stretching vibration appearing at a wave number higher than 1600 cm$^{-1}$ and the Raman line intensity Ib represents the ring stretching vibration appearing at a wave number lower than 1600 cm$^{-1}$ in the ring stretching vibration of para-substituted benzene in the laser Raman spectrum obtained by excitation with light of wavelength 457.9 nm.

3. A film formed of an organic polymer as claimed in claim 2, wherein the polymer has the intrinsic viscosity [$\eta$] of more than 0.4 dl/g measured in N-methyl-2-pyrrolidone at 30° C.

4. A method for producing an organic polymer soluble in an organic solvent and having the intrinsic viscosity ($\eta$) of more than 0.4 dl/g measured in N-methyl-2-pyrrolidone at 30° C., comprising the following steps:

(a) adding two equivalent amounts of an aqueous solution of an oxidizing agent per mole of aniline in the presence of a protonic acid having a pKa of less than 3.0, while maintaining aniline in a solvent at a temperature of less than 5° C. to form the oxidized polymer of aniline doped with said protonic acid, said oxidizing agent having the standard electrode potential of more than 0.6 V determined as an electromotive force in the reduction half cell reaction standardized with the standard hydrogen electrode, and wherein the term equivalent amount is defined as the amount obtained by dividing one mole of said oxidizing agent with the number of electrons necessary for reducing one molecule of said oxidizing agent; and, (b) undoping said oxidized polymer with a basic substance.

5. A method for producing an organic polymer soluble in an organic solvent and having the intrinsic viscosity ($\eta$) of more than 1.0 dl/g measured in N-methyl-2-pyrrolidone at 30° C., comprising the following steps:

(a) adding two equivalent amounts of an aqueous solution of an oxidizing agent per mole of aniline in the presence of a protonic acid having a pKa of less than 3.0, while maintaining aniline in a solvent at a temperature of less than 0° C. to form the oxidized polymer of aniline doped with said protonic acid, said oxidizing agent having the standard electrode potential of more than 0.6 V determined as an electromotive force in the reduction half cell reaction standardized with the standard hydrogen electrode, and wherein the term equivalent amount is defined as the amount obtained by dividing one mole of said oxidizing agent with the number of electrons necessary for reducing one molecule of said oxidizing agent;

(b) undoping said oxidized polymer with a basic substance.

6. A method for producing an organic polymer film comprising the following steps:

(a) dissolving an organic polymer in an organic solvent to form a solution;

(b) casting said solution; and, (c) evaporating said solvent, wherein said organic polymer has the main repeating unit represented by the general formula:

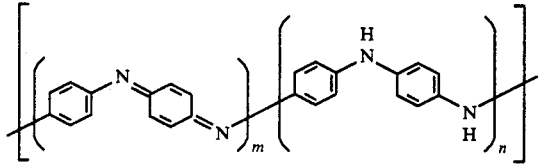

(wherein m and n, respectively, show the molar fraction of the quinonediimine structural unit and phenylenediamine structural unit in the repeating unit, and $0<m<1$, $0<n<1$ and $m+n=1$), and wherein, the Raman line intensity ratio Ia/Ib is greater than 1.0, wherein the Raman line intensity Ia represents the ring stretching vibration appearing at the wave number higher than 1600 cm$^{-1}$ and the Raman line intensity Ib represents the ring stretching vibration appearing at the wave number lower than 1600 cm$^{-1}$ in the ring stretching vibration of para-substituted benzene in the laser Raman spectrum obtained by excitation with light of wavelength 457.9 nm.

7. A method for producing an organic polymer film as claimed in claim 6 wherein said polymer has the intrinsic viscosity ($\eta$) of more than 1.0 dl/g measured in N-methyl-2-pyrrolidone at 30° C.

8. A method for producing an organic polymer fiber comprising the following steps:

(a) dissolving an organic polymer in an organic solvent to form a solution;

(b) spinning said solution; and,
(c) evaporating said solvent, wherein said organic polymer has the main repeating unit represented by the general formula:

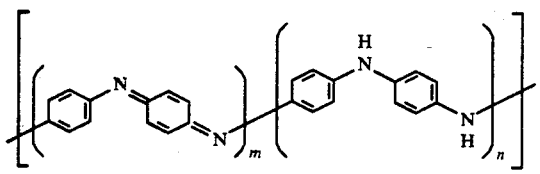

(wherein m and n, respectively, show the molar fraction of the quinonediimine structural unit and phenylenediamine structural unit in the repeating unit, and $0<m<1$, $0<n<1$ and $m+n=1$), and wherein, the Raman line intensity ratio Ia/Ib is greater than 1.0, wherein the Raman line intensity Ia represents the ring stretching vibration appearing at the wave number higher than 1600 cm$^{-1}$ and the Raman line intensity Ib represents the ring stretching vibration appearing at the wave number lower than 1600 cm$^{-1}$ in the ring stretching vibration of para-substituted benzene in the laser Raman spectrum obtained by excitation with light of wavelength 457.9 nm.

9. A method for producing an organic polymer fiber as claimed in claim 7 wherein said polymer has the intrinsic viscosity ($\eta$) of more than 1.0 dl/g measured in N-methyl-2-pyrrolidone at 30° C.

* * * * *